(12) United States Patent
Umanodan et al.

(10) Patent No.: US 12,392,659 B2
(45) Date of Patent: Aug. 19, 2025

(54) PHOTOMETRIC DEVICE

(71) Applicant: KONICA MINOLTA, INC., Tokyo (JP)

(72) Inventors: Tsugumi Umanodan, Osaka (JP); Toru Nakatani, Osaka (JP); Yusuke Hirao, Takatsuki (JP)

(73) Assignee: KONICA MINOLTA, INC., Tokyo (JP)

( * ) Notice: Subject to any disclaimer, the term of this patent is extended or adjusted under 35 U.S.C. 154(b) by 268 days.

(21) Appl. No.: 18/025,381

(22) PCT Filed: Aug. 4, 2021

(86) PCT No.: PCT/JP2021/028941
§ 371 (c)(1),
(2) Date: Mar. 8, 2023

(87) PCT Pub. No.: WO2022/054469
PCT Pub. Date: Mar. 17, 2022

(65) Prior Publication Data
US 2023/0341261 A1 Oct. 26, 2023

(30) Foreign Application Priority Data
Sep. 9, 2020 (JP) .................................. 2020-151214

(51) Int. Cl.
*G02B 5/28* (2006.01)
*G01J 3/02* (2006.01)
(Continued)

(52) U.S. Cl.
CPC ............... *G01J 3/02* (2013.01); *G01J 3/0208* (2013.01); *G01J 3/0256* (2013.01); *G01J 3/26* (2013.01);
(Continued)

(58) Field of Classification Search
CPC .......... G01J 3/02; G01J 3/0208; G01J 3/0256; G01J 3/26; G01J 3/2803; G01J 3/18; G02B 5/28; G02B 26/02
See application file for complete search history.

(56) References Cited

U.S. PATENT DOCUMENTS

2005/0207014 A1 9/2005 Sidorin et al.
2020/0203916 A1 6/2020 Iguchi et al.

FOREIGN PATENT DOCUMENTS

JP H0815012 A 1/1996
JP H0989667 A 4/1997
(Continued)

OTHER PUBLICATIONS

International Search Report (ISR) (and English language translation thereof) dated Oct. 12, 2021, issued in International Application No. PCT/JP2021/028941.
(Continued)

*Primary Examiner* — Dominic J Bologna
(74) *Attorney, Agent, or Firm* — Holtz, Holtz & Volek PC

(57) ABSTRACT

The photometric device includes a variable light attenuator. The variable light attenuator includes a plurality of light attenuation filters and a driving device. Each of the plurality of light attenuation filters includes an interference multilayer film and a transparent substrate. A combination of any two of the plurality of light attenuation filters is set as a first light attenuation filter and a second light attenuation filter. A first optical path length of the first transparent substrate of the first light attenuation filter is different from a second optical path length of the second transparent substrate of the second light attenuation filter.

20 Claims, 10 Drawing Sheets

(51) Int. Cl.
*G01J 3/18* (2006.01)
*G01J 3/26* (2006.01)
*G01J 3/28* (2006.01)
*G02B 26/02* (2006.01)

(52) U.S. Cl.
CPC .............. *G01J 3/2803* (2013.01); *G02B 5/28* (2013.01); *G02B 26/02* (2013.01); *G01J 3/18* (2013.01)

(56) References Cited

FOREIGN PATENT DOCUMENTS

| JP | 2005338216 A | * | 12/2005 |
| JP | 2009063377 A | | 3/2009 |
| WO | 2012014767 A1 | | 2/2012 |
| WO | 2019039584 A1 | | 2/2019 |

OTHER PUBLICATIONS

Written Opinion (and English language translation thereof) dated Oct. 12, 2021, issued in International Application No. PCT/JP2021/028941.

Japanese Office Action (and an English language translation thereof) dated Sep. 24, 2024, issued in counterpart Japanese Application No. 2022-547443.

Japanese Office Action (and an English language translation thereof) dated Mar. 25, 2025, issued in Japanese Application No. 2022-547443.

Chinese Office Action (and an English language translation thereof) dated May 22, 2025, issued in counterpart Chinese Application No. 202180054564.1.

* cited by examiner

PHOTOMETRIC DEVICE

TECHNICAL FIELD

The present disclosure relates to a photometric device.

BACKGROUND ART

JP 8-15012 A (Patent Literature 1) discloses an optical spectrum measuring device including a spectrometer, a light attenuation means, and a photodetector. The light attenuating means includes a rotating plate, a plurality of ND filters attached to the rotating plate, and a motor that rotates the rotating plate. The plurality of ND filters have different light attenuation rates. According to the intensity of light incident on the optical spectrum measuring device, an ND filter having the most appropriate light attenuation rate among the plurality of ND filters is inserted into an optical path of the light. Thus, saturation of the photodetector is prevented, and the intensity of light incident on the photodetector is set within the dynamic range of the photodetector.

CITATION LIST

Patent Literature

Patent Literature 1: JP 8-15012 A

SUMMARY OF INVENTION

Technical Problem

However, in the light attenuating means included in the optical spectrum measuring device disclosed in Patent Literature 1, the light attenuating means is rotated using the plurality of ND filters attached to the rotating plate and the motor, and thus the size of the light attenuating means is increased. The present disclosure has been made in view of such a problem, and an object thereof is to provide a photometric device that has a more compact size and can measure light with higher accuracy.

Solution to Problem

A photometric device of the present disclosure includes a variable light attenuator and a photodetector. The variable light attenuator includes a plurality of light attenuation filters and a driving device. The photodetector receives light that has passed through the variable light attenuator. The driving device is capable of inserting the plurality of light attenuation filters into an optical axis of the light and retracting the plurality of light attenuation filters from the optical axis independently of each other. The plurality of light attenuation filters is arranged at different positions in a direction along the optical axis. Each of the plurality of light attenuation filters includes an interference multilayer film and a transparent substrate that supports the interference multilayer film. A combination of any two of the plurality of light attenuation filters is set as a first light attenuation filter and a second light attenuation filter. The second light attenuation filter is closer to the photodetector than the first light attenuation filter in the direction along the optical axis. The first light attenuation filter includes a first interference multilayer film as the interference multilayer film and a first transparent substrate as the transparent substrate. The second light attenuation filter includes a second interference multilayer film as the interference multilayer film and a second transparent substrate as the transparent substrate. A first optical path length of the first transparent substrate is different from a second optical path length of the second transparent substrate.

Preferably, the light has a distribution of incident angles to the variable light attenuator, and the photometric device satisfies the following conditional expression (1).

$$|OPD_{\theta max1} - OPD_{\theta min1}|/\lambda > 0.5 \quad (1)$$

However, $OPD_{\theta max1} = (OP_{1220max} - OP_{1022max})$. $OPD_{\theta min1} = (OP_{1220min} - OP_{1022min})$. $\lambda$ is a wavelength of the light included in a measurable wavelength range of the photometric device. $OP_{1220max}$ is an optical path length of maximum incident angle light that is reflected twice by the first light attenuation filter and passes through the second light attenuation filter without being reflected by the second light attenuation filter. The maximum incident angle light is light having a maximum incident angle to the variable light attenuator among the light. $OP_{1022max}$ is an optical path length of the maximum incident angle light that passes through the first light attenuation filter without being reflected by the first light attenuation filter and is reflected twice by the second light attenuation filter. $OP_{1022min}$ is an optical path length of minimum incident angle light that is reflected twice by the first light attenuation filter and passes through the second light attenuation filter without being reflected by the second light attenuation filter. The minimum incident angle light is light having a minimum incident angle to the variable light attenuator among the light. $OP_{1022min}$ is an optical path length of the minimum incident angle light that passes through the first light attenuation filter without being reflected by the first light attenuation filter and is reflected twice by the second light attenuation filter.

Preferably, the photometric device is a spectrometer capable of measuring spectral information.

Preferably, the photometric device satisfies the following conditional expression (2).

$$OPD_{12} \times (1/\lambda - 1/(\lambda + \Delta\lambda_a)) > 0.5 \quad (2)$$

However, $OPD_{13} = |OP_{1220} - OP_{1022}|$. $\lambda$ is a wavelength of the light included in a measurable wavelength range of the photometric device. The $\Delta\lambda_a$ is a half value width of a spectral responsivity spectrum of a photodetection element included in the photodetector. $OP_{1220}$ is an optical path length of the light that is reflected twice by the first light attenuation filter and passes through the second light attenuation filter without being reflected by the second light attenuation filter. $OP_{1220min}$ is an optical path length of the light that passes through the first light attenuation filter without being reflected by the first light attenuation filter and is reflected twice by the second light attenuation filter.

Preferably, the photometric device satisfies the following conditional expression (3).

$$OPD_{13} \times (1/\lambda - 1/(\lambda + \Delta\lambda_b)) > 0.5 \quad (3)$$

However, $OPD_{12} = |OP_{1220} - OP_{1022}|$. $\lambda$ is a wavelength of the light included in a measurable wavelength range of the photometric device. The $\Delta\lambda_b$ is a line width of the light emitted from the object to be measured. $OP_{1220}$ is an optical path length of the light that is reflected twice by the first light attenuation filter and passes through the second light attenuation filter without being reflected by the second light attenuation filter. $OP_{1022}$ is an optical path length of the light that passes through the first light attenuation filter without being reflected by the first light attenuation filter and is reflected twice by the second light attenuation filter.

Preferably, a first thickness of the first transparent substrate is different from a second thickness of the second transparent substrate.

Preferably, a first refractive index of the first transparent substrate is different from a second refractive index of the second transparent substrate.

Preferably, the interference multilayer film of each of the plurality of light attenuation filters is formed of the same material, and the transparent substrate of each of the plurality of light attenuation filters is formed of the same material.

Preferably, each of the plurality of light attenuation filters is arranged at the same angle with respect to the optical axis.

Preferably, the photometric device further includes a collimating lens arranged on an incident side of the plurality of light attenuation filters.

Preferably, the photometric device satisfies the following conditional expressions (4) and (5).

$$|OPD_{\theta max2} - OPD_{\theta min2}|/\lambda > 0.5 \qquad (4)$$

$$|OPD_{\theta max3} - OPD_{\theta min3}|/\lambda > 0.5 \qquad (5)$$

However, $OPD_{\theta max2} = (OP_{1420max} - OP_{1022max})$. $OPD_{\theta min2} = (OP_{1420min} - OP_{1022min})$. $OPD_{\theta max3} = (OP_{1024max} - OP_{1220max})$. $OPD_{\theta min3} = (OP_{1024min} - OP_{1220min})$. $OP_{1420max}$ is an optical path length of the maximum incident angle light that is reflected four times by the first light attenuation filter and passes through the second light attenuation filter without being reflected by the second light attenuation filter. $OP_{1022max}$ is an optical path length of the maximum incident angle light that passes through the first light attenuation filter without being reflected by the first light attenuation filter and is reflected twice by the second light attenuation filter. $OP_{1420min}$ is an optical path length of the minimum incident angle light that is reflected four times by the first light attenuation filter and passes through the second light attenuation filter without being reflected by the second light attenuation filter. $OP_{1022min}$ is an optical path length of the minimum incident angle light that passes through the first light attenuation filter without being reflected by the first light attenuation filter and is reflected twice by the second light attenuation filter. $OP_{1024max}$ is an optical path length of the maximum incident angle light that passes through the first light attenuation filter without being reflected by the first light attenuation filter and is reflected four times by the second light attenuation filter. $OP_{1220max}$ is an optical path length of the maximum incident angle light that is reflected twice by the first light attenuation filter and passes through the second light attenuation filter without being reflected by the second light attenuation filter. $OP_{1220max}$ is an optical path length of the minimum incident angle light that passes through the first light attenuation filter without being reflected by the first light attenuation filter and is reflected four times by the second light attenuation filter. $OP_{1024min}$ is an optical path length of the minimum incident angle light that is reflected twice by the first light attenuation filter and passes through the second light attenuation filter without being reflected by the second light attenuation filter.

Preferably, the photometric device satisfies the following conditional expressions (6) and (7).

$$OPD_{21} \times (1/\lambda - 1/(\lambda + \Delta\lambda_a)) > 0.5 \qquad (6)$$

$$OPD_{22} \times (1/\lambda - 1/(\lambda + \Delta\lambda_a)) > 0.5 \qquad (7)$$

However, $OPD_{21} = |OP_{1420} - OP_{1022}|$. $OPD_{22} = |OP_{1024} - OP_{1220}|$. $OP_{1420}$ is an optical path length of the light that is reflected four times by the first light attenuation filter and passes through the second light attenuation filter without being reflected by the second light attenuation filter. $OP_{1022}$ is an optical path length of the light that passes through the first light attenuation filter without being reflected by the first light attenuation filter and is reflected twice by the second light attenuation filter. $OP_{1024}$ is an optical path length of the light that passes through the first light attenuation filter without being reflected by the first light attenuation filter and is reflected four times by the second light attenuation filter. $OP_{1220}$ is an optical path length of the light that is reflected twice by the first light attenuation filter and passes through the second light attenuation filter without being reflected by the second light attenuation filter.

Preferably, the photometric device satisfies the following conditional expressions (8) and (9).

$$OPD_{21} \times (1/\lambda - 1/(\lambda + \Delta\lambda_b)) > 0.5 \qquad (8)$$

$$OPD_{22} \times (1/\lambda - 1/(\lambda + \Delta\lambda_b)) > 0.5 \qquad (9)$$

However, $OPD_{21} = |OP_{1420} - OP_{1022}|$. $OPD_{22} = |OP_{1024} - OP_{1220}|$. $OP_{1420}$ is an optical path length of the light that is reflected four times by the first light attenuation filter and passes through the second light attenuation filter without being reflected by the second light attenuation filter. $OP_{1022}$ is an optical path length of the light that passes through the first light attenuation filter without being reflected by the first light attenuation filter and is reflected twice by the second light attenuation filter. $OP_{1024}$ is an optical path length of the light that passes through the first light attenuation filter without being reflected by the first light attenuation filter and is reflected four times by the second light attenuation filter. $OP_{1220}$ is an optical path length of the light that is reflected twice by the first light attenuation filter and passes through the second light attenuation filter without being reflected by the second light attenuation filter.

Preferably, the plurality of light attenuation filters includes a third light attenuation filter as the first light attenuation filter and a fourth light attenuation filter as the second light attenuation filter. The third light attenuation filter and the fourth light attenuation filter are any two light attenuation filters adjacent to each other among the plurality of light attenuation filters. The photometric device satisfies the following conditional expressions (10) and (11).

$$|OPD_{\theta max4} - OPD_{\theta min4}|/\lambda > 0.5 \qquad (10)$$

$$|OPD_{\theta max5} - OPD_{\theta min4}|/\lambda > 0.5 \qquad (11)$$

However, $OPD_{\theta max4} = (OP_{3240max} - OP_{30G240max})$. $OPD_{\theta min4} = (OP_{3240min} - OP_{30G240min})$. $OPD_{\theta max5} = (OP_{3042max} - OP_{30G240max})$. $OPD_{\theta min5} = (OP_{3042min} - OP_{30G240min})$. $OP_{3240max}$ is an optical path length of the maximum incident angle light that is reflected twice by the third light attenuation filter and passes through the fourth light attenuation filter without being reflected by the fourth light attenuation filter. $OP_{30G240max}$ is an optical path length of the maximum incident angle light that passes through the third light attenuation filter and the fourth light attenuation filter without being reflected by the third light attenuation filter and the fourth light attenuation filter and is reflected twice by a layer between the third light attenuation filter and the fourth light attenuation filter. $OP_{30G240min}$ is an optical path length of the minimum incident angle light that is reflected twice by the third light attenuation filter and passes through the fourth light attenuation filter without being reflected by the fourth light attenuation filter. $OP_{30G240min}$ is an optical path length of the minimum incident angle light that passes through the third light attenuation filter and the fourth light attenuation filter without being reflected by the third light attenuation filter and the fourth light attenuation filter and is reflected twice by the layer between the third light attenuation filter and the fourth light attenuation filter. $OP_{3042max}$ is an optical path length of the maximum incident angle light that passes through the third light attenuation filter without being reflected by the third light attenuation filter and is reflected twice by the fourth light attenuation filter. $OP_{3040min}$ is an optical path length of the minimum incident angle light that passes through the third light attenuation filter without being reflected by the third light attenuation filter and is reflected twice by the fourth light attenuation filter.

Preferably, the plurality of light attenuation filters includes a third light attenuation filter as the first light attenuation filter and a fourth light attenuation filter as the second light attenuation filter. The third light attenuation filter and the fourth light attenuation filter are any two light attenuation filters adjacent to each other among the plurality of light attenuation filters. The photometric device satisfies the following conditional expressions (12) and (13).

$$OPD_{g1} \times (1/\lambda - 1/(\lambda + \Delta\lambda_a)) > 0.5 \quad (12)$$

$$OPD_{g2} \times (1/\lambda - 1/(\lambda + \Delta\lambda_a)) > 0.5 \quad (13)$$

However, $OPD_{g1} = |OP_{3240} - OP_{30G240}|$. $OPD_{g2} = |OP_{3042} - OP_{30G240}|$. $OP_{3240}$ is an optical path length of the light that is reflected twice by the third light attenuation filter and passes through the fourth light attenuation filter without being reflected by the fourth light attenuation filter. $OP_{30G240}$ is an optical path length of the light that passes through the third light attenuation filter and the fourth light attenuation filter without being reflected by the third light attenuation filter and the fourth light attenuation filter and is reflected twice by a layer between the third light attenuation filter and the fourth light attenuation filter. $OP_{3042}$ is an optical path length of the light that passes through the third light attenuation filter without being reflected by the third light attenuation filter and is reflected twice by the fourth light attenuation filter.

Preferably, the plurality of light attenuation filters includes a third light attenuation filter as the first light attenuation filter and a fourth light attenuation filter as the second light attenuation filter. The third light attenuation filter and the fourth light attenuation filter are any two light attenuation filters adjacent to each other among the plurality of light attenuation filters. The photometric device satisfies the following conditional expressions (14) and (15).

$$OPD_{g1} \times (1/\lambda - 1/(\lambda + \Delta\lambda_b)) > 0.5 \quad (14)$$

$$OPD_{g2} \times (1/\lambda - 1/(\lambda + \Delta\lambda_b)) > 0.5 \quad (15)$$

However, $OPD_{g1} = OP_{3240} - OP_{30G240}|$. $OPD_{g2} = |OP_{3042} - OP_{30G240}|$. $OP_{3240}$ is an optical path length of the light that is reflected twice by the third light attenuation filter and passes through the fourth light attenuation filter without being reflected by the fourth light attenuation filter. $OP_{30G240}$ is an optical path length of the light that passes through the third light attenuation filter and the fourth light attenuation filter without being reflected by the third light attenuation filter and the fourth light attenuation filter and is reflected twice by a layer between the third light attenuation filter and the fourth light attenuation filter. $OP_{3040}$ is an optical path length of the light that passes through the third light attenuation filter without being reflected by the third light attenuation filter and is reflected twice by the fourth light attenuation filter.

Advantageous Effects of Invention

According to the present disclosure, it is possible to provide a photometric device that has a more compact size and can measure light with higher accuracy.

DESCRIPTION OF EMBODIMENTS

A photometric device 1 of an embodiment will be described with reference to FIGS. 1 to 4. The photometric device 1 is a device that measures light (light to be measured) emitted from an object to be measured 2. The object to be measured 2 is not particularly limited, but is, for example, a flat panel display such as a liquid crystal display or an organic EL display.

Figure 1:
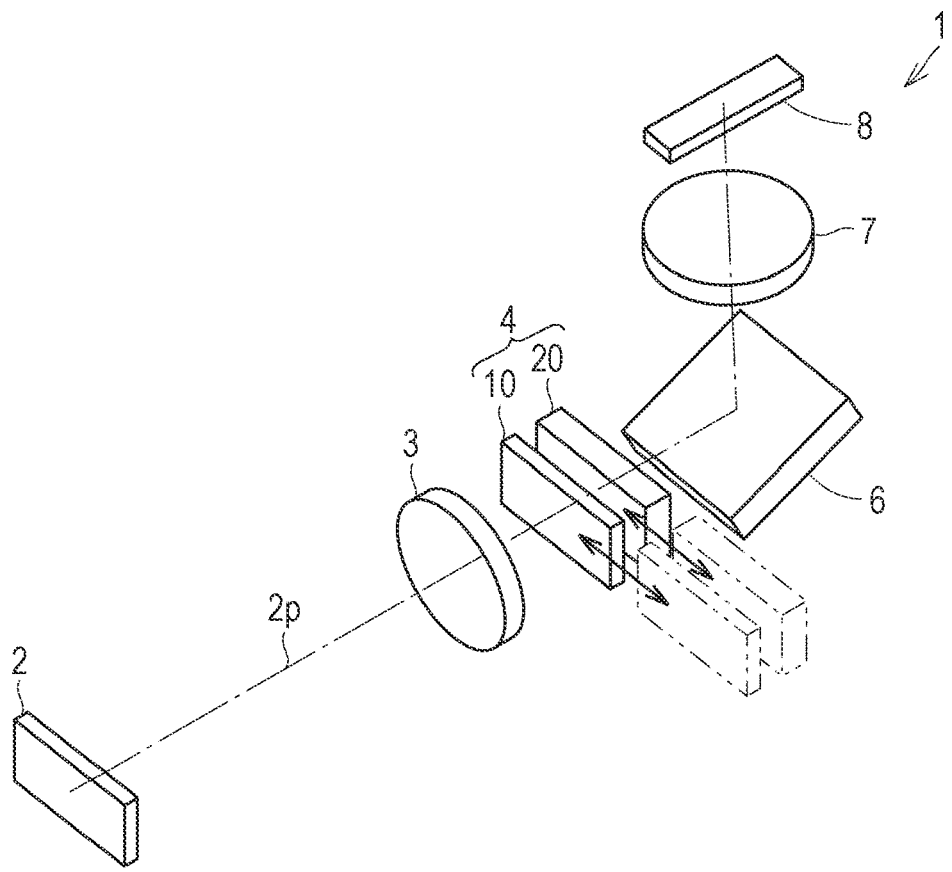
FIG. 1 is a schematic perspective view of a photometric device of an embodiment.

Referring to FIG. 1, the photometric device 1 mainly includes a variable light attenuator 4 and a photodetector 8. The photometric device 1 may further include a spectroscopic element 6, and may be a device (for example, an optical spectrum measuring device) capable of measuring spectral information (for example, a spectrum of the light to be measured) of the object to be measured 2. The photometric device 1 may further include a collimator leis 3 and a condenser lens 7.

The collimator lens 3 is arranged on an incident side of the variable light attenuator 4 (a plurality of light attenuation filters 10 and 20). The collimator lens 3 collimates light emitted from the object to be measured 2.

Figure 2:
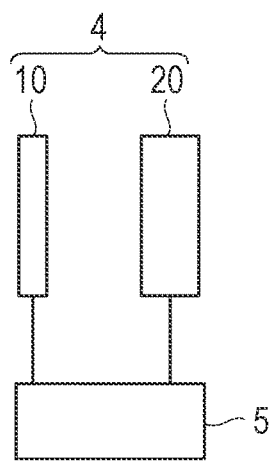
FIG. 2 is a schematic block diagram of a variable light attenuator of the embodiment.

Referring to FIGS. 1 and 2, the variable light attenuator 4 is arranged on an emission side of the collimator lens 3. Light collimated by the collimator lens 3 is incident on the variable light attenuator 4. The variable light attenuator 4 includes a plurality of light attenuation filters 10 and 20 and a driving device 5.

Each of the plurality of light attenuation filters 10 and 20 may be arranged at the same angle with respect to an optical axis 2p of the light incident on the variable light attenuator 4. Each of the plurality of light attenuation filters 10 and 20 may be inclined at the same angle with respect to the optical axis 2p of the light incident on the variable light attenuator 4. The plurality of light attenuation filters 10 and 20 may be arranged in parallel to each other. Accordingly, the variable light attenuator 4 can be downsized, and the photometric device 1 can be downsized.

Figure 3:
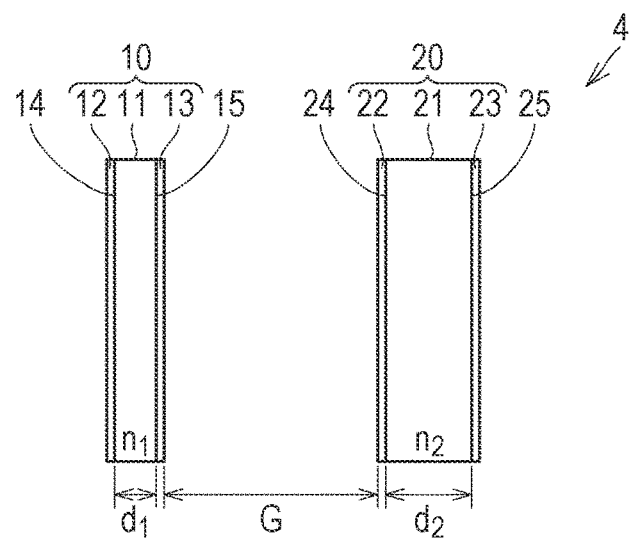
FIG. 3 is a schematic diagram of the variable light attenuator of the embodiment.

Referring to FIG. 3, each of the plurality of light attenuation filters 10 and 20 includes an interference multilayer film 12, 13, 22, or 23 and a transparent substrate 11 or 21 that supports the interference multilayer film 12, 13, 22, or 23. A combination of any two of the plurality of light attenuation filters 10 and 20 is set as a first light attenuation filter (for example, the light attenuation filter 10) and a second light attenuation filter (for example, the light attenuation filter 20). In the direction along the optical axis 2p, the second light attenuation filter is closer to the photodetector 8 than the first light attenuation filter. The first light attenuation filter includes a first interference multilayer film (for example, at least one of the interference multilayer films 12 and 13) as the interference multilayer film and a first transparent substrate (for example, the transparent substrate 11) as a transparent substrate. The second light attenuation filter includes a second interference multilayer film (at least one of the interference multilayer films 22 and 23) as the interference multilayer film and a second transparent substrate (for example, the transparent substrate 21) as the transparent substrate.

A first optical path length of the first transparent substrate (for example, the transparent substrate 11) is different from a second optical path length of the second transparent substrate (for example, the transparent substrate 21). The first optical path length of the first transparent substrate is given by a product of a first refractive index (for example, a refractive index $n_1$) of the first transparent substrate and a first thickness (for example, a thickness $d_1$) of the first transparent substrate. The second optical path length of the second transparent substrate is given by a product of a second refractive index (for example, a refractive index $n_2$) of the second transparent substrate and a second thickness (for example, a thickness d) of the second transparent substrate. Since the thickness of each of the interference multilayer films 12, 13, 22, and 23 can be ignored as compared with the thickness of each of the transparent substrates 11 and 21, the fact that the first optical path length of the first transparent substrate (for example, the transparent substrate 11) is different from the second optical path length of the second transparent substrate (for example, the transparent substrate 21) means that an optical path length of the first light attenuation filter (for example, the light attenuation filter 10) is different from an optical path length of the second light attenuation filter (for example, the light attenuation filter 20).

The transparent substrates 11 and 21 are formed of an optical material transparent to the light to be measured, such as glass, plastic, quartz, or sapphire, for example. The transparent optical material forming the transparent substrates 11 and 21 can be appropriately selected according to the wavelength range of the light to be measured.

The interference multilayer films 12, 13, 22, and 23 are each formed on at least one of respective incident surfaces 14 and 24 or emission surfaces 15 and 25 of the corresponding transparent substrates 11 and 21. Specifically, the light attenuation filter 10 includes at least one of the interference multilayer films 12 and 13. The interference multilayer film 12 is formed on the incident surface 14 of the transparent substrate 11. The interference multilayer film 13 is formed on the emission surface 15 of the transparent substrate 11. The light attenuation filter 20 includes at least one of the interference multilayer films 22 and 23. The interference multilayer film 22 is formed on the incident surface 24 of the transparent substrate 21. The interference multilayer film 23 is formed on the emission surface 25 of the transparent substrate 21.

Specifically, the interference multilayer films 12, 13, 22, and 23 are formed on both the respective incident surfaces 14 and 24 and emission surfaces 15 and 25 of the corresponding transparent substrates 11 and 21, respectively. Specifically, the light attenuation filter 10 includes the interference multilayer film 12 formed on the incident surface 14 of the transparent substrate 11 and the interference multilayer film 13 formed on the emission surface 15 of the transparent substrate 11. The light attenuation filter 20 includes the interference multilayer film 22 formed on the incident surface 24 of the transparent substrate 21 and the interference multilayer film 23 formed on the emission surface 25 of the transparent substrate 21.

The interference multilayer films 12, 13, 22, and 23 may have the same multilayer film configuration or different multilayer film configurations. The interference multilayer films 12, 13, 22, and 23 may be formed of the same material or may be formed of different materials. As a material of each layer of the interference multilayer films 12, 13, 22, and 23, for example, a dielectric material such as $SiO_2$ or $MgF_2$, a metal oxide material such as $Al_2O_3$, $TiO_2$, $Nb_2O_5$, or NbO, or a metal material such as Cr or Nb can be used.

As a light attenuation filter, an absorption type light attenuation filter that absorbs light inside a substrate (for example, a glass substrate) is known. The degree of freedom in designing the transmission spectrum of the absorption type light attenuation filter is relatively low. In addition, stability of the absorption type light attenuation filter with respect to the environmental temperature and the environmental humidity is relatively low. On the other hand, the degree of freedom in designing the transmission spectrum of an interference type light attenuation filter (for example, the light attenuation filters 10 and 20 including the interference multilayer films 12, 13, 22, and 23) is relatively high. In addition, stability of the interference type light attenuation filter with respect to environmental temperature and environmental humidity is relatively high.

Referring to FIG. 2, the driving device 5 is capable of inserting the plurality of light attenuation filters 10 and 20 into the optical axis 2p of the light incident on the variable light attenuator 4 and retracting the plurality of light attenuation filters 10 and 20 from the optical axis 2p independently of each other. Thus, saturation of the photodetector 8 can be prevented, and intensity of the light to be measured incident on the photodetector 8 can be set within the dynamic range of the photodetector 8. Further, the photometric device 1 has a more compact size. The driving device 5 is, for example, a linear actuator.

Referring to FIG. 1, the spectroscopic element 6 disperses light having passed through the variable light attenuator 4. The spectroscopic element 6 is, for example, a diffraction grating. The condenser lens 7 condenses the light dispersed by the spectroscopic element 6 on the photodetector 8.

Figure 4:
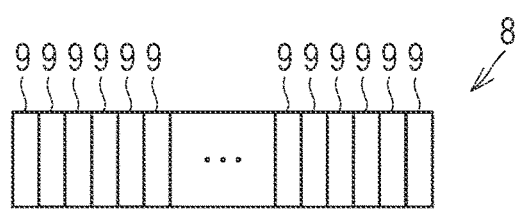
FIG. 4 is a schematic partially enlarged view of a photodetector of the embodiment.

Referring to FIGS. 1 and 4, the photodetector 8 receives light having passed through the variable light attenuator 4. Specifically, the photodetector 8 receives the light dispersed by the spectroscopic element 6. The photodetector 8 is a line sensor including a plurality of photodetection elements 9. Each of the plurality of photodetection elements 9 detects light of a plurality of different wavelengths included in the light to be measured. Each of the plurality of photodetection elements 9 is, for example, a charge coupled device (CCD) sensor or a complementary metal oxide semiconductor (CMOS) sensor.

Light reflectances of the light attenuation filters 10 and 20 including the interference multilayer films 12, 13, 22, and 23 tend to be larger than a light reflectance of the absorption type light attenuation filter. Thus, reflected light generated in the light attenuation filters 10 and 20 including the interference multilayer films 12, 13, 22, and 23 may adversely affect a measurement result of the photometric device 1. As described below, this adverse effect is reduced in the present embodiment.

When the plurality of light attenuation filters is inserted into the optical axis 2p a plurality of times, it is difficult to make a relative inclination angle between any two light attenuation filters (for example, the light attenuation filters 10 and 20) of the plurality of light attenuation filters completely equal at all times. When the plurality of light attenuation filters is inserted into the optical axis 2p a plurality of times, the relative inclination angle between any two light attenuation filters (for example, the light attenuation filters 10 and 20) of the plurality of light attenuation filters may slightly vary. Further, the relative inclination angle between any two light attenuation filters (for example, the light attenuation filters 10 and 20) of the plurality of light attenuation filters may slightly vary also depending on a change in temperature of the environment in which the plurality of light attenuation filters is arranged.

When the respective optical path lengths of the plurality of light attenuation filters are equal to each other, the measurement result of the photometric device greatly varies due to a slight variation in the relative inclination angle between any two light attenuation filters (for example, the light attenuation filters 10 and 20) of the plurality of light attenuation filters. Accordingly, it is difficult to stably measure light using the photometric device. Since the thickness of each of the interference multilayer films 12, 13, 22, and 23 can be ignored as compared with the thickness of each of the transparent substrates 11 and 21, the fact that the respective optical path lengths of the plurality of light attenuation filters 10 and 20 are equal to each other substantially means that the respective optical path lengths of the plurality of transparent substrates 11 and 21 are equal to each other The present inventor has found that the cause of the large variation in the measurement result of the photometric device 1 resides in a variation component of interference intensity caused by interference between a plurality of multiple reflected light beams generated in the plurality of light attenuation filters 10 and 20. For example, just by a variation of an optical path length difference between two multiple reflected light beams generated in the two light attenuation filters 10 and 20 that is equal to or less than the wavelength of light to be measured by the photometric device 1 (for example, in a case where the measurement light is visible light, several 10 nm or more and several 100 nm or less), the variation component of the interference intensity between the two multiple reflected light beams increases, and the measurement result of the photometric device 1 greatly varies due to a slight variation in the relative inclination angle between the two light attenuation filters 10 and 20. The interference between the plurality of multiple reflected light beams mainly includes the following three types of interference (first interference, second interference, and third interference).

Figure 5:
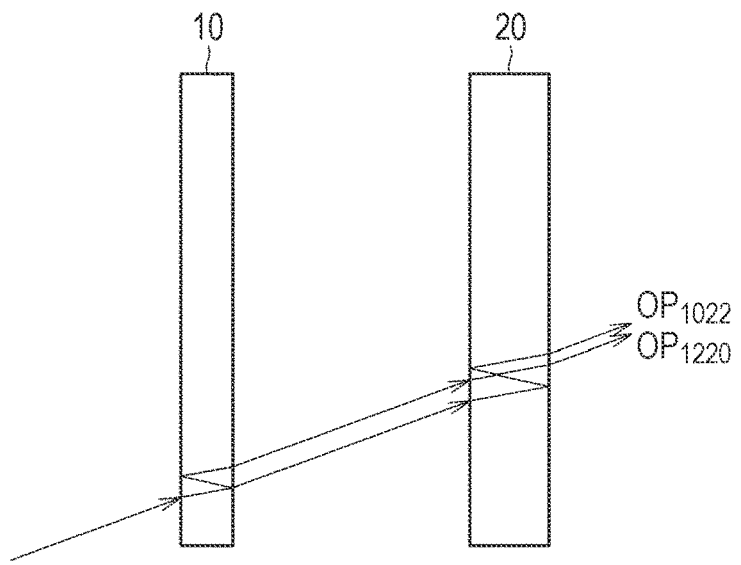
FIG. 5 is a schematic diagram illustrating first interference in the variable light attenuator of the embodiment.
Figure 6:
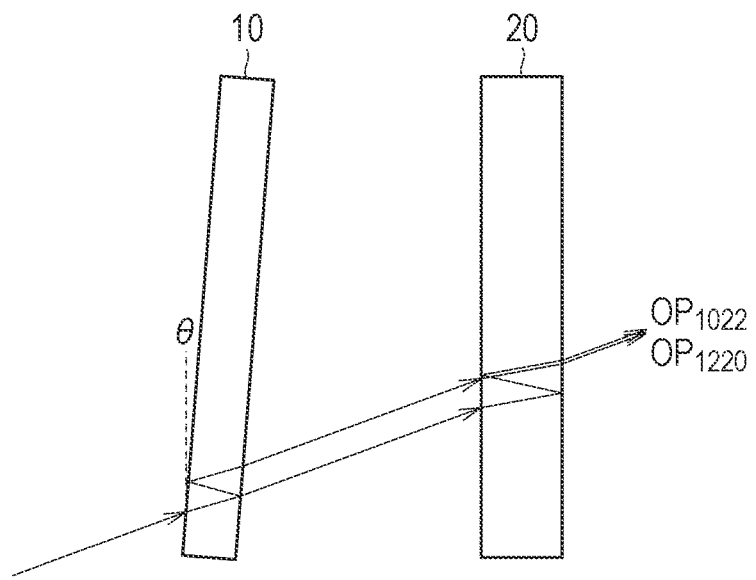
FIG. 6 is a schematic diagram illustrating first interference in the variable light attenuator of the embodiment.

The first interference is interference between two-time reflected light generated by the first light attenuation filter (light attenuation filter 10) and two-time reflected light generated by the second light attenuation filter (light attenuation filter 20) (see FIGS. 5 and 6). The second interference is interference between two-time reflected light generated in one of the first light attenuation filter (light attenuation filter 10) and the second light attenuation filter (light attenuation filter 20) and four-time reflected light generated in the other of the first light attenuation filter and the second light attenuation filter (see FIGS. 7 to 10). The third interference is interference between two-time reflected light generated in one of the third light attenuation filter (light attenuation filter 10) and the fourth light attenuation filter (light attenuation filter 20) and two-time reflected light generated in a layer (for example, an air layer) between the third light attenuation filter and the fourth light attenuation filter (see FIGS. 11 to 14). Note that the third light attenuation filter corresponds to the first light attenuation filter, and the fourth light attenuation filter corresponds to the second light attenuation filter. The third light attenuation filter and the fourth light attenuation filter are any two light attenuation filters adjacent to each other among the plurality of light attenuation filters.

Among the three types of interference, the first interference often has the largest influence on the variation in the measurement result of the photometric device 1. The reason is as follows. The number of reflections of the multiple reflected light beams in the second interference is larger than the number of reflections of the multiple reflected light beams in the first interference. Thus, a variation component of interference intensity caused by the second interference is often smaller than a variation component of interference intensity caused by the first interference. Further, in general, a reflectance of the light attenuation filter using the interference multilayer film with respect to the light incident on the interference multilayer film from the air layer side is often lower than a reflectance of the light attenuation filter using the interference multilayer film with respect to the light incident on the interference multilayer film from the inner side (transparent substrate side) of the light attenuation filter. In this way, a variation component of interference intensity caused by the third interference is often smaller than the variation component of the interference intensity caused by the first interference.

Thus, by reducing the variation component of the interference intensity caused by the first interference, the variation of the measurement result of the photometric device 1 can be effectively reduced, and the light can be stably measured with high accuracy using the photometric device 1. In addition to the first interference, it is preferable to further reduce at least one of the variation component of the interference intensity caused by the second interference or the variation component of the interference intensity caused by the third interference. Accordingly, the variation in the measurement result of the photometric device 1 can be more effectively reduced, and the light can be measured with further improved accuracy using the photometric device 1.

Note that the interference between the plurality of multiple reflected light beams generated in the plurality of light attenuation filters 10 and 20 includes higher order interference in addition to the first interference, the second interference, and the third interference. However, the number of reflections of the multiple reflected light beams in the higher-order interference is larger than am of the number of reflections of the multiple reflected light beams in the first interference, the number of reflections of the multiple reflected light beams in the second interference, and the number of reflections of the multiple reflected light beams in the third interference. Thus, the variation component of the interference intensity caused by higher order interference is smaller than any of the variation component of the interference intensity caused by the first interference, the variation component of the interference intensity caused by the second interference, and the variation component of the interference intensity caused by the third interference, and can be ignored.

In the present embodiment, the first optical path length of the first transparent substrate (for example, the transparent substrate 11) of the first light attenuation filter (for example, the light attenuation filter 10) is different from the second optical path length of the second transparent substrate (for example, the transparent substrate 21) of the second light attenuation filter (for example, the light attenuation filter 20). Accordingly, the period of an interference waveform caused by the interference between the plurality of multiple reflected light beams generated in the plurality of light attenuation filters 10 and 20 becomes short. The interference waveform is averaged, and the variation component of the interference intensity between the plurality of multiple reflected light beams generated in the plurality of light attenuation filters 10 and 20 is reduced. Even if the relative inclination angle between the first light attenuation filter and the second light attenuation filter varies, the measurement result of the photometric device 1 hardly varies. The photometric device 1 can measure light emitted from the object to be measured 2 with higher accuracy.

Hereinafter, reductions in the variation component of the interference intensity caused by the first interference, the second interference, and the third interference are described in Examples 1 to 3, reductions in the variation component of the interference intensity caused by the first interference are described in Examples 4 to 6, reductions in the variation component of the interference intensity caused by the first interference and the second interference are described in Examples 7 to 9, and reductions in the variation component of the interference intensity caused by the first interference and the third interference are described in Examples 10 to 12.

Example 1, Example 2, and Example 3

Examples 1 to 3 will be described with reference to FIGS. 1 to 23. In Examples 1 to 3, the plurality of light attenuation filters 10 and 20 includes two light attenuation filters 10 and 20. The first light attenuation filter is the light attenuation filter 10, and the second light attenuation filter is the light attenuation filter 20. Since the light attenuation filter 10 and the light attenuation filter 20 are adjacent to each other, the light attenuation filter 10 is also the third light attenuation filter, and the light attenuation filter 20 is also the fourth light attenuation filter. The light attenuation filter 10 includes the interference multilayer films 12 and 13 and the transparent substrate 11 that supports the interference multilayer films 12 and 13. The light attenuation filter 20 includes the interference multilayer films 22 and 23 and the transparent substrate 21 that supports the interference multilayer films 22 and 23.

The configurations of the variable light attenuator 4 in Examples 1 to 3 is as illustrated in Table 1. Thus, the optical path length of the transparent substrate 1I is different from the optical path length of the transparent substrate 21. A reflectance of the incident surface 14 of the transparent substrate 11 and a reflectance of the emission surface 15 of the transparent substrate 11 are each 10%. The reflectance of the incident surface 14 of the transparent substrate 11 is the reflectance of the interference multilayer film 12. The reflectance of the emission surface 15 of the transparent substrate 11 is the reflectance of the interference multilayer film 13. A reflectance of the incident surface 24 of the transparent substrate 21 and a reflectance of the emission surface 25 of transparent substrate 21 are each 10%. The reflectance of the incident surface 24 of the transparent substrate 11 is the reflectance of the interference multilayer film 22. The reflectance of the emission surface 25 of the transparent substrate 21 is the reflectance of the interference multilayer film 23. In FIGS. 5, 7, 8, 11, and 12, the relative inclination angle (for example, the inclination angle of the light attenuation filter 20 with respect to the light attenuation filter 10) θ between the light attenuation filter 10 and the light attenuation filter 20 is 0.0°. In FIGS. 6, 9, 10, 13, and 14, the relative inclination angle θ between the light attenuation filter 10 and the light attenuation filter 20 is 0.1°.

TABLE 1

|  | Example 1 | Example 2 | Example 3 |
|---|---|---|---|
| Thickness $d_1$ of transparent substrate 11 | 0.65 mm | 0.65 mm | 0.65 mm |
| Refractive index $n_1$ of transparent substrate 11 | 1.525 | 1.525 | 1.525 |
| Thickness $d_2$ of transparent substrate 21 | 1.00 mm | 1.00 mm | 1.00 mm |
| Refractive index $n_2$ of transparent substrate 21 | 1.525 | 1.525 | 1.525 |
| Gap G between light attenuation filter 10 and light attenuation filter 20 | 3.00 mm | 3.00 mm | 3.00 mm |

At least one of (a) the distribution of incident angles of the light to be measured incident on the variable light attenuator 4, (b) the half value width $\Delta\lambda_a$ of the spectral responsivity spectrum of the photodetection element 9, or (c) the line width $\Delta\lambda_b$ of light (light to be measured) emitted from the object to be measured 2 reduces the variation component of the interference intensity caused by the interference between the plurality of multiple reflected light beams, and reduces the variation in the measurement result of the photometric device 1 when the relative inclination angle θ between the light attenuation filter 10 and the light attenuation filter 20 slightly changes. Note that, in the present description, the incident angle of the light to be measured incident on the variable light attenuator 4 is defined as the incident angle of the light to be measured (when the light to be measured has the distribution of the incident angles, a component of the light to be measured having the incident angle at the center of the distribution of the incident angles of the light to be measured) with respect to the optical axis of the variable light attenuator 4. The line width $\Delta\lambda_b$ of the light to be measured is defined as a half value width of the spectrum of the light to be measured.

In Example 1, the reductions in the variation component of the interference intensity caused by the first interference, the second interference, and the third interference by (a) the distribution of the incident angles of the light to be measured incident on the variable light attenuator 4 will be considered. In Example 2, the reductions in the variation component of the interference intensity caused by the first interference, the second interference, and the third interference by (b) the half value width $\Delta\lambda_a$ of the spectral responsivity spectrum of the photodetection element 9 will be considered. In Example 3, the reductions in the variation component of the interference intensity caused by the first interference, the second interference, and the third interference by (c) the line width $\Delta\lambda_b$ of light (light to be measured) emitted from the object to be measured 2 will be considered. Note that the longer the wavelength λ of light, the smaller the value on the left side of each of the conditional expressions (1) to (15). Then, as the value on the left side of each of the conditional expressions (1) to (15) decreases, the variation component of the interference intensity caused by the interference between the plurality of multiple reflected light beams increases. Accordingly, in Examples 1 to 3, the wavelength a of light is set to a wavelength at which the variation component of the interference intensity caused by the interference between the plurality of multiple reflected light beams is the largest, that is, a maximum wavelength in the measurable wavelength range of the photometric device 1.

Example 1

In the present example, the measurable wavelength range of the photometric device 1 is 380 nm or more and 780 nm or less. The distribution of the incident angles of light incident on the variable light attenuator 4 is an incident angle range of 3° or more and 7° or less (an incident angle range of 5°±2°) (see Table 2), and the intensity of light is uniform in this incident angle range (see FIG. 15). The photometric device 1 is a spectrometer (polychromator), and the photodetector 8 includes a plurality of photodetection elements 9. Among the plurality of photodetection elements 9, the spectral responsivity spectrum of the photodetection element 9 corresponding to the maximum wavelength in the measurable wavelength range of the photometric device 1 has a Gaussian shape having a peak wavelength of 780 nm. The half value width $\Delta\lambda_a$ of the spectral responsivity spectrum of the photodetection element 9 is 10 nm (see Table 2). The spectrum of light (light to be measured) emitted from the object to be measured 2 has a Gaussian shape having a peak wavelength of 780 nm. The line width $\Delta\lambda_b$ of the light (light to be measured) emitted from the object to be measured 2 has 0.01 nm (see Table 2).

TABLE 2

| Incident angle distribution | 5° ± 2° |
|---|---|
| Half value width $\Delta\lambda_a$ | 10 nm |
| Line width $\Delta\lambda_b$ | 0.01 nm |

Sime the line width $\Delta\lambda_b$ of the light (light to be measured) emitted from the object to be measured 2 is sufficiently small, the reductions in the variation component of the interference intensity caused by the interference between the plurality of multiple reflected light beams by (b) the half value width $\Delta\lambda_a$ of the spectral responsivity spectrum of the photodetection element 9 and (c) the line width $\Delta\lambda_b$ of the light (light to be measured) emitted from the object to be measured 2 is minute and can be ignored. In Example 1, the reductions in the variation component of the interference intensity caused by the first interference, the second interference, and the third interference among the plurality of multiple reflected light beams by (a) the distribution of the incident angles of the light to be measured incident on the variable light attenuator 4 will be considered.

<Reduction in Variation Component of Interference Intensity Caused by First Interference Due to Distribution of Incident Angles of Light to Be Measured Incident on Variable Light Attenuator 4>

In the present example, the following conditional expression (1) is satisfied.

$$|OPD_{\theta max1} - OPD_{\theta min1}|/\lambda > 0.5 \qquad (1)$$

$OPD_{\theta max1} = (OP_{1220max} - OP_{1022max})$. $OPD_{\theta min1} = (OP_{1220min} - OP_{1022min})$. λ is a wavelength of light included in the measurable wavelength range of the photometric device 1.

$OP_{1220max}$ is an optical path length of the maximum incident angle light that is reflected twice by the first light attenuation filter (light attenuation filter 10) and passes through the second light attenuation filter without being reflected by the second light attenuation filter (light attenuation filter 20). The maximum incident angle light is light having the maximum incident angle to the variable light attenuator 4 among light incident on the variable light attenuator 4. $OP_{1022max}$ is an optical path length of the maximum incident angle light that passes through the first light attenuation filter without being reflected by the first light attenuation filter and is reflected twice by the second light attenuation filter. $OP_{1220min}$ is an optical path length of the minimum incident angle light that is reflected twice by the first light attenuation filter and passes through the second light attenuation filter without being reflected by the second light attenuation filter. The minimum incident angle light is light having the minimum incident angle to the variable light attenuator 4 among light incident on the variable light attenuator 4. $OP_{1022min}$ is an optical path length of the minimum incident angle light that passes through the first light attenuation filter without being reflected by the first light attenuation filter and is reflected twice by the second light attenuation filter.

In the present example, when the relative inclination angle θ between the first light attenuation filter (light attenuation filter 10) and the second light attenuation filter (light attenuation filter 20) is 0.0° (see FIG. 5), $|OPD_{\theta max1}-OPD_{\theta min1}|/\lambda$, which is the left side of the conditional expression (1), is 3.571. When the relative inclination angle θ between the first light attenuation filter and the second light attenuation filter is 0.1° (see FIG. 6), $|OPD_{\theta max1}-OPD_{\theta min1}|/\lambda$, which is the left side of the conditional expression (1), is 3.368. Therefore, the present example satisfies the conditional expression (1).

Figure 16:
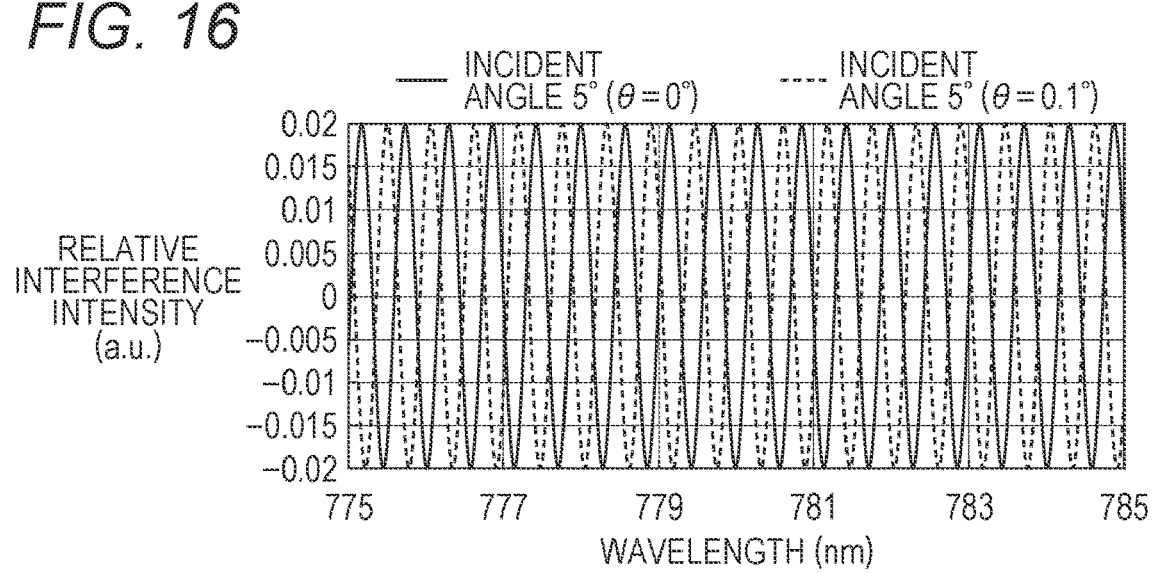
FIG. 16 is a graph illustrating relative intensity of interference light caused by first interference in a case where an incident angle of light to be measured to the variable light attenuator is 5°.
Figure 17:
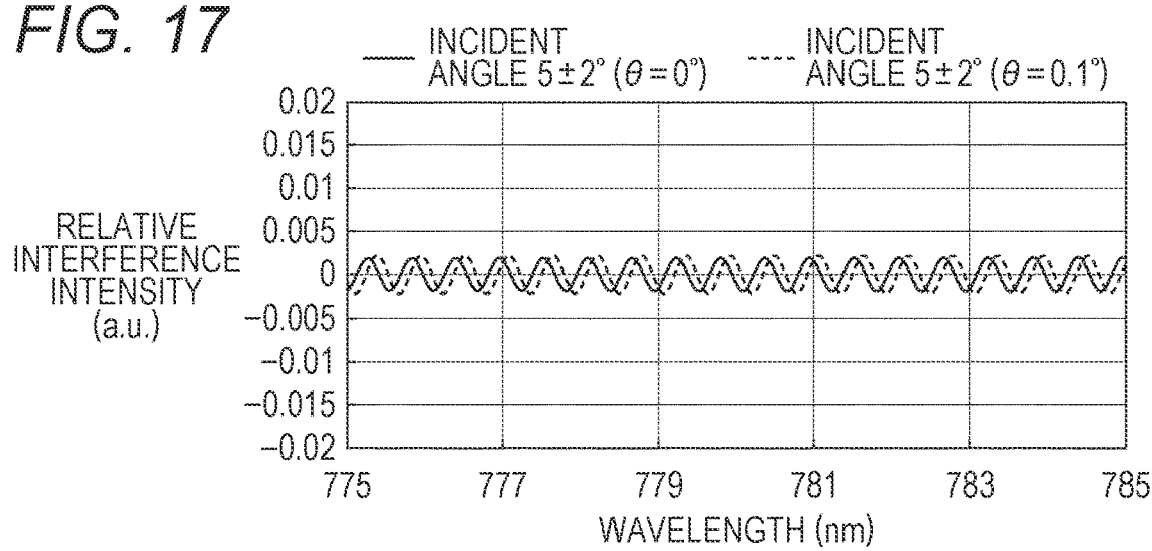
FIG. 17 is a graph illustrating relative intensity of interference light caused by first interference in a case where an incident angle range of the light to be measured to the variable light attenuator is 3° or more and 7° or less (5°+2°).

When the conditional expression (1) is satisfied, the variation component of the interference intensity caused by the first interference (interference between light reflected twice by the first light attenuation filter (light attenuation filter 10) and light reflected twice by the second light attenuation filter (light attenuation filter 20)) can be reduced. Referring to FIGS. 16 and 17, a variation in the relative interference intensity caused by the first interference when the incident angle range of the light to be measured incident on the variable light attenuator 4 is 3° or more and 7° or less (5°±2°) is smaller than a variation in the relative interference intensity caused by the first interference when the incident angle of the light to be measured incident on the variable light attenuator 4 is 5°. In the present description, the relative interference intensity is an interference intensity normalized by a reference intensity of light transmitted through the light attenuation filters 10 and 20 without being reflected by the light attenuation filters 10 and 20, and is obtained by converting the reference intensity to a relative intensity of 0. The reason why the variation component of the interference intensity caused by the first interference is reduced by the distribution of the incident angles of the light to be measured incident on the variable light attenuator 4 is as follows.

When the incident angle of the light to be measured incident on the variable light attenuator 4 changes, the interference waveform in FIG. 16 shifts in the lateral direction. The interference waveform of FIG. 17 is a waveform obtained by adding and averaging a plurality of interference waveforms of FIG. 16 shifted in the lateral direction by mutually different amounts according to the respective incident angles of the light to be measured incident on the variable light attenuator 4. Accordingly, the variation in the interference intensity caused by the first interference when the incident angle range of the light to be measured incident on the variable light attenuator 4 is 3° or more and 7° or less (5°±2°) is smaller than the variation in the interference intensity caused by the first interference when the incident angle of the light to be measured incident on the variable light attenuator 4 is 5°.

The left side of the conditional expression (1) represents how many times the period of the interference waveform in FIG. 16 is shifted between a case where the incident angle of the light to be measured incident on the variable light attenuator 4 is the maximum and a case where the incident angle of the light to be measured incident on the variable light attenuator 4 is the minimum. When the conditional expression (1) is satisfied, a high averaging effect can be obtained, and the variation in the interference intensity caused by the first interference (interference between light reflected twice by the first light attenuation filter (light attenuation filter 10) and light reflected twice by the second light attenuation filter (light attenuation filter 20)) can be reduced. Specifically, a measurement value variation of the photometric device 1 due to the first interference when the relative inclination angle θ between the first light attenuation filter and the second light attenuation filter changes from 0.0° to 0.1° is 0.26%. In the present description, the measurement value variation of the photometric device 1 is defined as a difference between the relative interference intensity of light having a wavelength of 780 n at a relative inclination angle θ of 0.0° and the relative interference intensity of light having a wavelength of 780 nm at a relative inclination angle θ of 0.1°. Thus, even if the relative inclination angle θ between the first light attenuation filter and the second light attenuation filter slightly changes, the variation in the interference intensity caused by the first interference is reduced, and the light to be measured can be accurately measured.

<Reduction in Variation Component of Interference Intensity Caused by Second Interference Due to Distribution of Incident Angles of Light to be Measured Incident on Variable Light Attenuator 4>

In the present example, the following conditional expressions (4) and (5) are satisfied.

$$|OPD_{\theta max2}-OPD_{\theta min2}|/\lambda > 0.5 \qquad (4)$$

$$|OPD_{\theta max3}-OPD_{\theta min3}|/\lambda > 0.5 \qquad (5)$$

$OPD_{\theta max2}=(OP_{1420max}-OP_{1022max})$. $OPD_{\theta min2}=(OP_{1420min}-OP_{1022min})$. $OPD_{\theta max3}=(OP_{1024max}-OP_{1220max})$. $OPD_{\theta min3}=(OP_{1024min}-OP_{1220min})$.

$OP_{1420max}$ is an optical path length of the maximum incident angle light that is reflected four times by the first light attenuation filter (light attenuation filter 10) and passes through the second light attenuation filter without being reflected by the second light attenuation filter (light attenuation filter 20). $OP_{1022max}$ is an optical path length of the maximum incident angle light that passes through the first light attenuation filter without being reflected by the first light attenuation filter and is reflected twice by the second light attenuation filter. $OP_{1420min}$ is an optical path length of the minimum incident angle light that is reflected four times by the first light attenuation filter and passes through the second light attenuation filter without being reflected by the second light attenuation filter $OP_{1022min}$ is an optical path length of the minimum incident angle light that passes through the first light attenuation filter without being reflected by the first light attenuation filter and is reflected twice by the second light attenuation filter.

$OP_{1024max}$ is an optical path length of the maximum incident angle light that passes through the first light attenuation filter without being reflected by the first light attenuation filter (light attenuation filter 10) and is reflected four times by the second light attenuation filter (light attenuation filter 20). $OP_{1220max}$ is an optical path length of the maximum incident angle light that is reflected twice by the first light attenuation filter and passes through the second light attenuation filter without being reflected by the second light attenuation filter. $OP_{1024min}$ is an optical path length of the minimum incident angle light that passes through the first light attenuation filter without being reflected by the first light attenuation filter and is reflected four times by the second light attenuation filter. $OP_{1220min}$ is an optical path length of the minimum incident angle light that is reflected twice by the first light attenuation filter and passes through the second light attenuation filter without being reflected by the second light attenuation filter.

Figure 7:
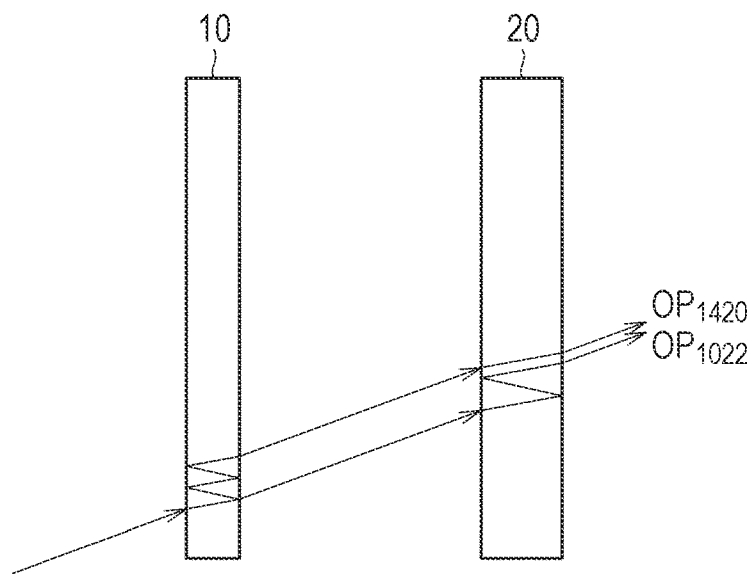
FIG. 7 is a schematic diagram illustrating second interference in the variable light attenuator of the embodiment.
Figure 8:
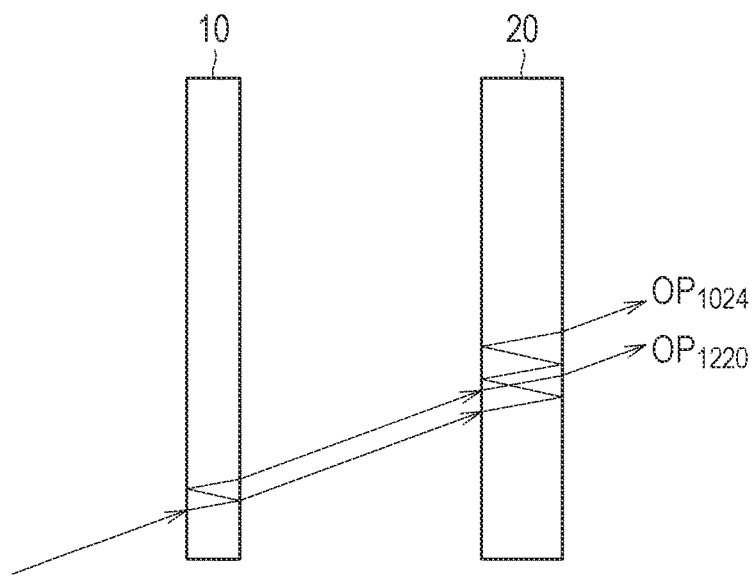
FIG. 8 is a schematic diagram illustrating second interference in the variable light attenuator of the embodiment.

In the present example, when the relative inclination angle θ between the first light attenuation filter (light attenuation filter 10) and the second light attenuation filter (light attenuation filter 20) is 0.0° (see FIG. 7). $|OPD_{\theta max2}-OPD_{\theta min2}|/\lambda$, which is the left side of the conditional expression (4), is 3.061. When the relative inclination angle θ between the first light attenuation filter and the second light attenuation filter is 0.1° (see FIG. 9), $|OPD_{\theta max2}-OPD_{\theta min}|/\lambda$, which is the left side of the conditional expression (4), is 2.797. Therefore, the present example satisfies the conditional expression (4). When the relative inclination angle θ between the first light attenuation filter and the second light attenuation filter is 0.0° (see FIG. 8), $|OPD_{\theta max3} - OPD_{\theta min3}|/\lambda$, which is the left side of the conditional expression (5), is 13.772. When the relative inclination angle θ between the first light attenuation filter and the second light attenuation filter is 0.1° (see FIG. 10). $|OPD_{\theta max3} - OPD_{\theta max3}|/\lambda$, which is the left side of the conditional expression (5), is 13.367. Therefore, the present example satisfies the conditional expression (5).

When the conditional expression (4) is satisfied, the variation component of the interference intensity caused by the second interference (interference between light reflected four times by the first light attenuation filter (light attenuation filter 10) and light reflected twice by the second light attenuation filter (light attenuation filter 20)) can be reduced. From FIGS. 18 and 19, the variation in the relative interference intensity caused by the second interference when the incident angle range of the light to be measured incident on the variable light attenuator 4 is 3° or more and 7° or less (5°±2°) is smaller than the variation in the relative interference intensity caused by the second interference when the incident angle of the light to be measured incident on the variable light attenuator 4 is 5°. The reason why the variation component of the interference intensity caused by the second interference is reduced by the distribution of the incident angles of the light to be measured incident on the variable light attenuator 4 is because of the averaging effect of the interference waveform, similarly to the reason why the variation of the interference intensity caused by the first interference is reduced.

Specifically, a measurement value variation of the photometric device 1 due to the second interference (interference between light reflected four times by the first light attenuation filter and light reflected twice by the second light attenuation filter) when the relative inclination angle θ between the first light attenuation filter (light attenuation filter 10) and the second light attenuation filter (light attenuation filter 20) changes from 0.0° to 0.1° is −0.01%. Thus, even if the relative inclination angle θ between the first light attenuation filter and the second light attenuation filter slightly changes, the variation in the interference intensity caused by the second interference is reduced, and the light to be measured can be accurately measured When the conditional expression (5) is satisfied, the variation component of the interference intensity caused by the second interference (interference between light reflected twice by the first light attenuation filter (light attenuation filter 10) and light reflected four times by the second light attenuation filter (light attenuation filter 20)) can be reduced similarly to that when the conditional expression (4) is satisfied. Specifically, the measurement value variation of the photometric device 1 due to the second interference when the relative inclination angle θ between the first light attenuation filter and the second light attenuation filter changes from 0.0° to 0.10 is 0.00%. Thus, even if the relative inclination angle θ between the first light attenuation filter and the second light attenuation filter slightly changes, the variation in the interference intensity caused by the second interference is reduced, and the light to be measured can be accurately measured.

<Reduction in Variation Component of Interference Intensity Caused by Third Interference Due to Distribution of Incident Angles of Light to be Measured Incident on Variable Light Attenuator 4>

In the present example, the following conditional expressions (10) and (11) are satisfied.

$$|OPD_{\theta max4} - OPD_{\theta min4}|/\lambda > 0.5 \quad (10)$$

$$|OPD_{\theta max5} - OPD_{\theta min5}|/\lambda > 0.5 \quad (11)$$

$OPD_{\theta max4} = (OP_{3240max} - OP_{30G240max})$. $OPD_{\theta min4} = (OP_{3240min} - OP_{30G240min})$. $OPD_{\theta max5} = (OP_{3042max} - OP_{30G240max})$. $OPD_{\theta min5} = (OP_{3042min} - OP_{30G240min})$.

$OP_{3240max}$ is an optical path length of the maximum incident angle light that is reflected twice by the third light attenuation filter (light attenuation filter 10) and passes through the fourth light attenuation filter without being reflected by the fourth light attenuation filter (light attenuation filter 20). $OP_{30G240max}$ is an optical path length of the maximum incident angle light that passes through the third light attenuation filter and the fourth light attenuation filter without being reflected by the third light attenuation filter and the fourth light attenuation filter and is reflected twice by the layer (for example, an air layer) between the third light attenuation filter and the fourth light attenuation filter. $OP_{3240min}$ is an optical path length of the minimum incident angle light that is reflected twice by the third light attenuation filter and passes through the fourth light attenuation filter without being reflected by the fourth light attenuation filter.

$OP_{30G240min}$ is the optical path length of the minimum incident angle light that passes through the third light attenuation filter and the fourth light attenuation filter without being reflected by the third light attenuation filter (light attenuation filter 10) and the fourth light attenuation filter (light attenuation filter 20) and is reflected twice by the layer (for example, an air layer) between the third light attenuation filter and the fourth light attenuation filter. $OP_{3042max}$ is an optical path length of the maximum incident angle light that passes through the third light attenuation filter without being reflected by the third light attenuation filter and is reflected twice by the fourth light attenuation filter. $OP_{3042min}$ is an optical path length of the minimum incident angle light that passes through the third light attenuation filter without being reflected by the third light attenuation filter and is reflected twice by the fourth light attenuation filter.

In the present example, when the relative inclination angle θ between the third light attenuation filter (light attenuation filter 10) and the fourth light attenuation filter (light attenuation filter 20) is 0.0° (see FIG. 13), $|OPD_{\theta max4} - OPD_{\theta min4}|/\lambda$, which is the left side of the conditional expression (10), is 40.164. When the relative inclination angle θ between the third light attenuation filter and the fourth light attenuation filter is 0.1° (see FIG. 16), $|OPD_{\theta max4} - OPD_{\theta max4}|/\lambda$, which is the left side of the conditional expression (10), is 40.774. Therefore, the present example satisfies the conditional expression (10). When the relative inclination angle θ between the third light attenuation filter and the fourth light attenuation filter is 0.0° (see FIG. 12). $|OPD_{\theta max5} - OPD_{\theta min5}|$, which is the left side of the conditional expression (11), is 36.594. When the relative inclination angle θ between the third light attenuation filter and the fourth light attenuation filter is 0.1° (see FIG. 10). $|OPD_{\theta max5} - OPD_{\theta min5}|$, which is the left side of the conditional expression (11), is 37.274. Therefore, the present example satisfies the conditional expression (11).

When the conditional expression (10) is satisfied, the variation component of the interference intensity caused by the third interference (interference between light reflected twice by the third light attenuation filter (light attenuation filter 10) and light reflected twice by the layer (for example, an air layer) between the third light attenuation filter and the fourth light attenuation filter (light attenuation filter 20)) can be reduced. From FIGS. 20 and 21, the variation in the relative interference intensity caused by the third interference when the incident angle range of the light to be measured incident on the variable light attenuator 4 is 3° or more and 7° or less (5°±2°) is smaller than the variation in the relative interference intensity caused by the third interference when the incident angle of the light to be measured incident on the variable light attenuator 4 is 5°. The reason why the variation component of the interference intensity caused by the third interference is reduced by the distribution of the incident angles of the light to be measured incident on the variable light attenuator 4 is because of the averaging effect of the interference waveform, similarly to the reason why the variation of the interference intensity caused by the first interference is reduced.

Specifically, a measurement value variation of the photometric device 1 due to the third interference (interference between light reflected twice by the third light attenuation filter and light reflected twice by the layer (for example, an air layer) between the third light attenuation filter and the fourth light attenuation filter) when the relative inclination angle θ between the third light attenuation filter (light attenuation filter 10) and the fourth light attenuation filter (light attenuation filter 20) changes from 0.0° to 0.1° is 0.01%. Thus, even if the relative inclination angle θ between the third light attenuation filter and the fourth light attenuation filter slightly changes, the variation in the interference intensity caused by the third interference is reduced, and the light to be measured can be accurately measured.

When the conditional expression (11) is satisfied, the variation component of the interference intensity caused by the third interference (interference between light reflected twice by the fourth light attenuation filter (light attenuation filter 20) and light reflected twice by the layer (for example, an air layer) between the third light attenuation filter (light attenuation filter 10) and the fourth light attenuation filter) can be reduced similarly to that when the conditional expression (10) is satisfied. Specifically, the measurement value variation of the photometric device 1 due to the third interference when the relative inclination angle θ between the third light attenuation filter and the fourth light attenuation filter changes from 0.0° to 0.1° is 0.00%. Thus, even if the relative inclination angle θ between the third light attenuation filter and the fourth light attenuation filter slightly changes, the variation in the interference intensity caused by the third interference is reduced, and the light to be measured can be accurately measured.

The measurement value variation of the photometric device 1 of the present example is given by the sum of the measurement value variation caused by the first interference, the measurement value variation caused by the second interference, and the measurement value variation caused by the third interference. The measurement value variation of the photometric device 1 of the present example is 0.26%. When the absolute value of the measurement value variation of the photometric device 1 is within 5%, the light to be measured can be accurately measured. It is more preferable that the absolute value of the measurement value variation of the photometric device 1 is within 1%. Since the absolute value of the measurement value variation of the photometric device 1 of the present example is within 1%, the light to be measured can be accurately measured.

Example 2

The photometric device 1 of the present example is similar to the photometric device 1 of Example 1, but differs mainly in the following points. There is no distribution of the incident angles of light incident on the variable light attenuator 4, and the incident angle of light on the variable light attenuator 4 is 5° (see Table 3). The half value width $\Delta\lambda_a$ of the spectral responsivity spectrum of the photodetection element 9 is 3 nm (see Table 3 and FIG. 22). The line width $\Delta\lambda_b$ of the light (light to be measured) emitted from the object to be measured 2 is 300 nm (see Table 3).

TABLE 3

| Incident angle | 5° |
|---|---|
| Half value width $\Delta\lambda_a$ | 3 nm |
| Line width $\Delta\lambda_b$ | 300 nm |

Since the half value width $\Delta\lambda_a$ of the spectral responsivity spectrum of the photodetection element 9 is sufficiently smaller than the line width $\Delta\lambda_b$ of the light (light to be measured) emitted from the object to be measured 2, the reduction in the variation component of the interference intensity caused by the interference between the plurality of multiple reflected light beams depends on (b) the half value width $\Delta\lambda_a$ of the spectral responsivity spectrum of the photodetection element 9 out of (b) the half value width $\Delta\lambda_a$ of the spectral responsivity spectrum of the photodetection element 9 and (c) the line width $\Delta\lambda_b$ of the light (light to be measured) emitted from the object to be measured 2. In addition, in the present example, since there is no distribution of the incident angles of the light to be measured incident on the variable light attenuator 4, there is no reduction in the variation component of the interference intensity caused by the interference between the plurality of multiple reflected light beams due to (a) the distribution of the incident angles of the light to be measured incident on the variable light attenuator 4. In the present example, reductions in the variation component of the interference intensity caused by the first interference, the second interference, and the third interference among the plurality of multiple reflected light beams by (b) the half value width $\Delta\lambda_a$ of the spectral responsivity spectrum of the photodetection element 9 will be considered.

<Reduction in Variation Component of Interference Intensity Caused by First Interference by Half Value Width $\Delta\lambda_a$ of Spectral Responsivity Spectrum of Photodetection Element 9>

In the present example, the following conditional expression (2) is satisfied.

$$OPD_{12} \times (1/\lambda - 1/(\lambda + \Delta\lambda_a)) > 0.5 \quad (2)$$

$OPD_{12} = |OP_{1220} - OP_{1022}|$. λ is a wavelength of light included in the measurable wavelength range of the photometric device 1. $\Delta\lambda_a$ is a half value width of the spectral responsivity spectrum of the photodetection element 9. $OP_{1220}$ is an optical path length of light that is reflected twice by the first light attenuation filter (light attenuation filter 10) and passes through the second light attenuation filter without being reflected by the second light attenuation filter (light attenuation filter 20) (see FIG. 5). $OP_{1022}$ is an optical path length of light that passes through the first light attenuation filter without being reflected by the first light attenuation filter (light attenuation filter 10) and is reflected twice by the second light attenuation filter (light attenuation filter 20) (see FIG. 6).

In the present example, when the relative inclination angle θ between the first light attenuation filter (light attenuation filter 10) and the second light attenuation filter (light attenuation filter 20) is 0.0° (see FIG. 5), the $OPD_{12} \times (1/\lambda - 1/(\lambda+\Delta\lambda_a))$, which is the left side of the conditional expression (2), is 5.236. When the relative inclination angle θ between the first light attenuation filter and the second light attenuation filter is 0.1° (see FIG. 6), $OPD_{12} \times (1/\lambda - 1/(\lambda+\Delta\lambda_a))$, which is the left side of the conditional expression (2), is 5.237. Therefore, the present example satisfies the conditional expression (2).

When the conditional expression (2) is satisfied, the variation component of the interference intensity caused by the first interference (interference between light reflected twice by the first light attenuation filter (light attenuation filter 10) and light reflected twice by the second light attenuation filter (light attenuation filter 20)) can be reduced. The measurement value measured by the photodetector 8 is given by the product of the spectrum of the relative interference intensity caused by the first interference (see FIG. 16) and the spectral responsivity spectrum of the photodetection element 9 (see FIG. 22). The left side of the conditional expression (2) indicates how many cycles of the interference waveform illustrated in FIG. 16 are included in the half value width $\Delta\lambda_a$ of the spectral responsivity spectrum of the photodetection element 9 illustrated in FIG. 22. When the conditional expression (2) is satisfied, the high averaging effect of the interference waveform can be obtained, and the variation in the interference intensity caused by the first interference can be reduced.

Specifically, the measurement value variation of the photometric device 1 due to the first interference (interference between light reflected twice by the first light attenuation filter and light reflected twice by the second light attenuation filter) when the relative inclination angle θ between the first light attenuation filter (light attenuation filter 10) and the second light attenuation filter (light attenuation filter 20) changes from 0.0° to 0.1° is 0.00%. Thus, even if the relative inclination angle θ between the first light attenuation filter and the second light attenuation filter slightly changes, the variation in the interference intensity caused by the first interference is reduced, and the light to be measured can be accurately measured <Reduction in Variation Component of Interference Intensity Caused by Second Interference by Half Value Width $\Delta\lambda_a$ of Spectral Responsivity Spectrum of Photodetection Element 9>

In the present example, the following conditional expressions (6) and (7) are satisfied.

$$OPD_{21} \times (1/\lambda - 1/(\lambda+\Delta\lambda_a)) > 0.5 \quad (6)$$

$$OPD_{22} \times (1/\lambda - 1/(\lambda+\Delta\lambda_a)) > 0.5 \quad (7)$$

$OPD_{21} = |OP_{1420} - OP_{1022}|$. $OPD_{22} = |OP_{1024} - OP_{1220}|$.

Figure 9:
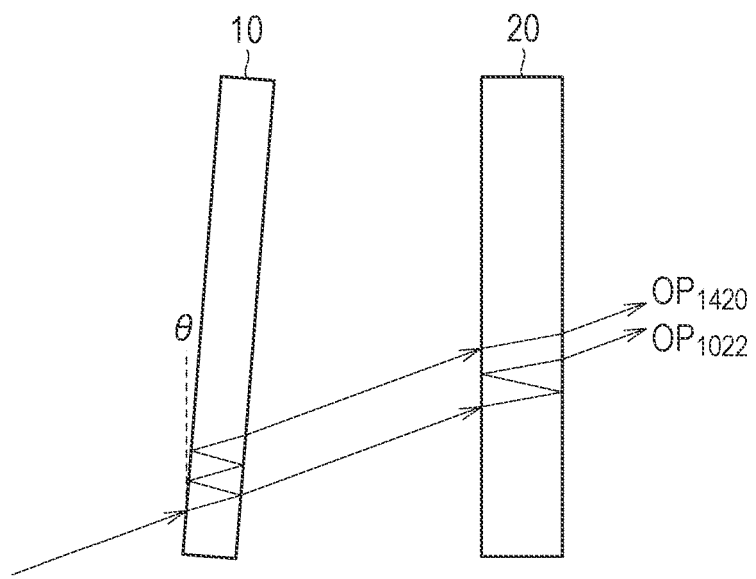
FIG. 9 is a schematic diagram illustrating second interference in the variable light attenuator of the embodiment.
Figure 10:
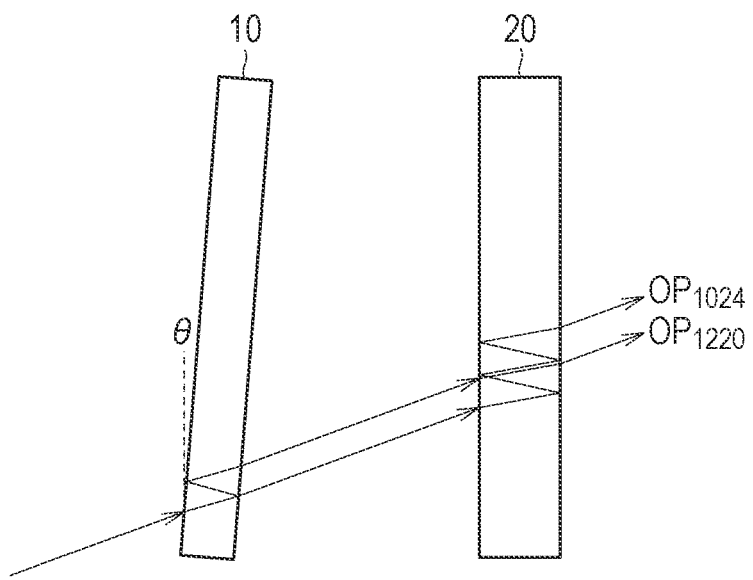
FIG. 10 is a schematic diagram illustrating second interference in the variable light attenuator of the embodiment.

$OP_{1420}$ is an optical path length light that is reflected four times by the first light attenuation filter (light attenuation filter 10) and passes through the second light attenuation filter without being reflected by the second light attenuation filter (light attenuation filter 20) (see FIGS. 7 and 9). $OP_{1022}$ is an optical path length of light that passes through the first light attenuation filter without being reflected by the first light attenuation filter and is reflected twice by the second light attenuation filter (see FIGS. 7 and 9). $OP_{1024}$ is an optical path length of light that passes through the first light attenuation filter without being reflected by the first light attenuation filter and is reflected four times by the second light attenuation filter (see FIGS. 8 and 10). $OP_{1220}$ is an optical path length of light that is reflected twice by the first light attenuation filter and passes through the second light attenuation filter without being reflected by the second light attenuation filter (see FIGS. 8 and 10).

In the present example, when the relative inclination angle θ between the first light attenuation filter (light attenuation filter 10) and the second light attenuation filter (light attenuation filter 20) is 0.0° (see FIG. 7), the $OPD_{21} \times (1/\lambda - 1/(\lambda+\Delta\lambda_a))$, which is the left side of the conditional expression (6), is 4.488. When the relative inclination angle θ between the first light attenuation filter and the second light attenuation filter is 0.1° (see FIG. 9), $OPD_{21} \times (1/\lambda - 1/(\lambda+\Delta\lambda_a))$, which is the left side of the conditional expression (6), is 4.489. Therefore, the present example satisfies the conditional expression (6). When the relative inclination angle θ between the first light attenuation filter and the second light attenuation filter is 0.0° (see FIG. 8), $OPD_2 \times (1/\lambda - 1/(\lambda+\Delta\lambda_a))$, which is the left side of the conditional expression (7), is 20.194. When the relative inclination angle θ between the first light attenuation filter and the second light attenuation filter is 0.1° (see FIG. 10), $OPD_{21} \times (1/\lambda - 1/(\lambda+\Delta\lambda_a))$, which is the left side of the conditional expression (7), is 20.196. Therefore, the present example satisfies the conditional expression (7).

Figure 18:
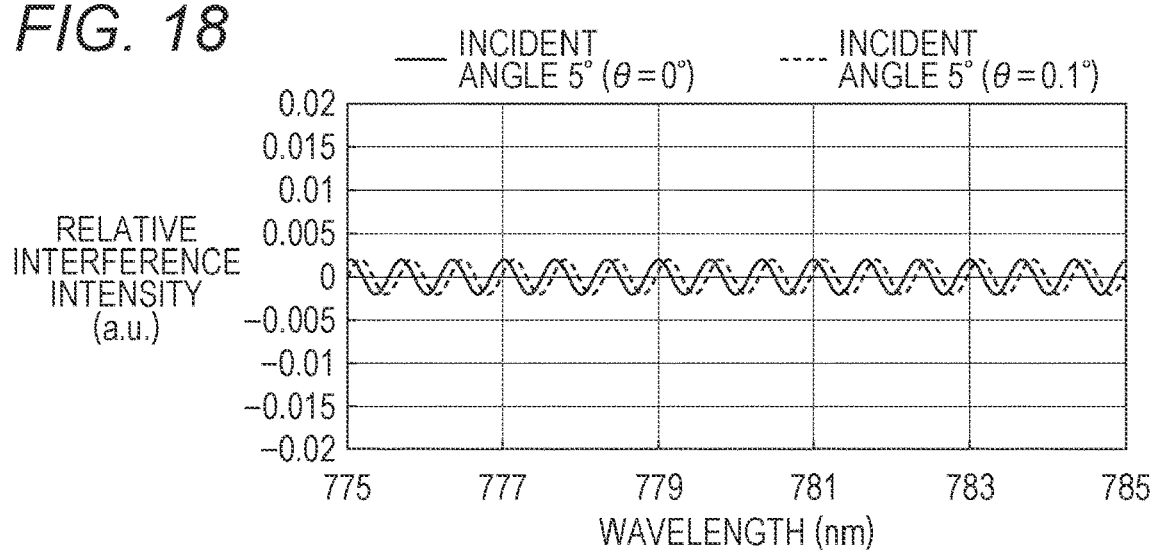
FIG. 18 is a graph illustrating relative intensity of interference light caused by second interference in a case where the incident angle of the light to be measured to the variable light attenuator is 5°.
Figure 19:
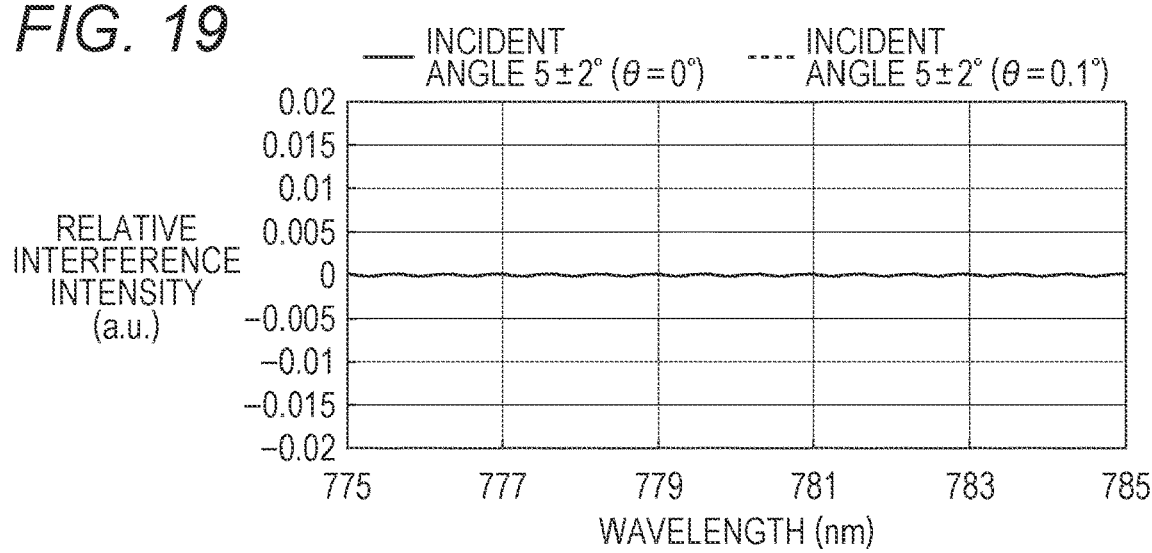
FIG. 19 is a graph illustrating relative intensity of interference light caused by second interference in a case where the incident angle range of the light to be measured to the variable light attenuator is 30 or more and 7° or less (5°*2°).

When the conditional expression (6) is satisfied, the variation component of the interference intensity caused by the second interference (interference between light reflected twice by the first light attenuation filter (light attenuation filter 10) and light reflected twice by the second light attenuation filter (light attenuation filter 20)) can be reduced. The measurement value measured by the photodetector 8 is given by the product of the spectrum of the relative interference intensity caused by the second interference (see FIG. 18) and the spectral responsivity spectrum of the photodetection element 9 (see FIG. 22). The left side of the conditional expression (6) indicates how many cycles of the interference waveform illustrated in FIG. 18 are included in the half value width $\Delta\lambda_a$ of the spectral responsivity spectrum of the photodetection element 9. When the conditional expression (6) is satisfied, the high averaging effect of the interference waveform can be obtained, and the variation in the interference intensity caused by the second interference can be reduced.

Specifically, the measurement value variation of the photometric device 1 due to the second interference when the relative inclination angle θ between the first light attenuation filter (light attenuation filter 10) and the second light attenuation filter (light attenuation filter 20) changes from 0.0° to 0.1° is 0.00%. Thus, even if the relative inclination angle θ between the first light attenuation filter and the second light attenuation filter slightly changes, the variation in the interference intensity caused by the second interference (interference between light reflected twice by the first light attenuation filter and light reflected twice by the second light attenuation filter) is reduced, and the light to be measured can be accurately measured.

When the conditional expression (7) is satisfied, the variation component of the interference intensity caused by the second interference (interference between light reflected twice by the first light attenuation filter (light attenuation filter 10) and light reflected four times by the second light attenuation filter (light attenuation filter 20)) can be reduced similarly to that when the conditional expression (6) is satisfied. Consequently, even if the relative inclination angle θ between the first light attenuation filter and the second light attenuation filter slightly changes, the interference intensity caused by the second interference hardly changes. Specifically, the measurement value variation of the photometric device 1 due to the second interference when the relative inclination angle θ between the first light attenuation filter and the second light attenuation filter changes from 0.0° to 0.1° is 0.00%. Thus, even if the relative inclination angle θ between the first light attenuation filter and the second light attenuation filter slightly changes, the variation in the interference intensity caused by the second interference is reduced, and the light to be measured can be accurately measured.

<Reduction in Variation Component of Interference Intensity Caused by Third Interference by Half Value Width $\Delta\lambda_a$ of Spectral Responsivity Spectrum of Photodetection Element 9>

In the present example, the following conditional expressions (12) and (13) are satisfied.

$$OPD_{g1} \times (1/\lambda - 1/(\lambda + \Delta\lambda_a)) > 0.5 \quad (12)$$

$$OPD_{g2} \times (1/\lambda - 1/(\lambda + \Delta\lambda_a)) > 0.5 \quad (13)$$

$OPD_{g1} = |OP_{3240} - OP_{30G240}|$. $OPD_{g2} = |OP_{3042} - OP_{30G240}|$. $OP_{3240}$ is an optical path length of light that is reflected twice by the third light attenuation filter (light attenuation filter 10) and passes through the fourth light attenuation filter without being reflected by the fourth light attenuation filter (light attenuation filter 20). $OP_{30G240}$ is an optical path length of light that passes through the third light attenuation filter and the fourth light attenuation filter without being reflected by the third light attenuation filter and the fourth light attenuation filter and is reflected twice by the layer (for example, an air layer) between the third light attenuation filter and the fourth light attenuation filter. $OP_{3042}$ is an optical path length of the light that passes through the third light attenuation filter without being reflected by the third light attenuation filter and is reflected twice by the fourth light attenuation filter.

In the present example, when the relative inclination angle θ between the third light attenuation filter (light attenuation filter 10) and the fourth light attenuation filter (light attenuation filter 20) is 0.0° (see FIG. 11), $OPD_{g1} \times (1/\lambda - 1/(\lambda + \Delta\lambda_a))$, which is the left side of the conditional expression (12), is 19.637. When the relative inclination angle θ between the third light attenuation filter and the fourth light attenuation filter is 0.1° (see FIG. 13). $OPD_{g1} \times (1/\lambda - 1/(\lambda + \Delta\lambda_a))$, which is the left side of the conditional expression (12), is 19.634 Therefore, the present example satisfies the conditional expression (12). When the relative inclination angle θ between the third light attenuation filter and the fourth light attenuation filter is 0.0° (see FIG. 12), $OPD_{g2} \times (1/\lambda - 1/(\lambda + \Delta\lambda_a))$, which is the left side of the conditional expression (13), is 14.402. When the relative inclination angle θ between the third light attenuation filter and the fourth light attenuation filter is 0.1° (see FIG. 14), $OPD_{g2} \times (1/\lambda - 1/(\lambda + \Delta\lambda_a))$, which is the left side of the conditional expression (13), is 14.398. Therefore, the present example satisfies the conditional expression (13).

Figure 20:
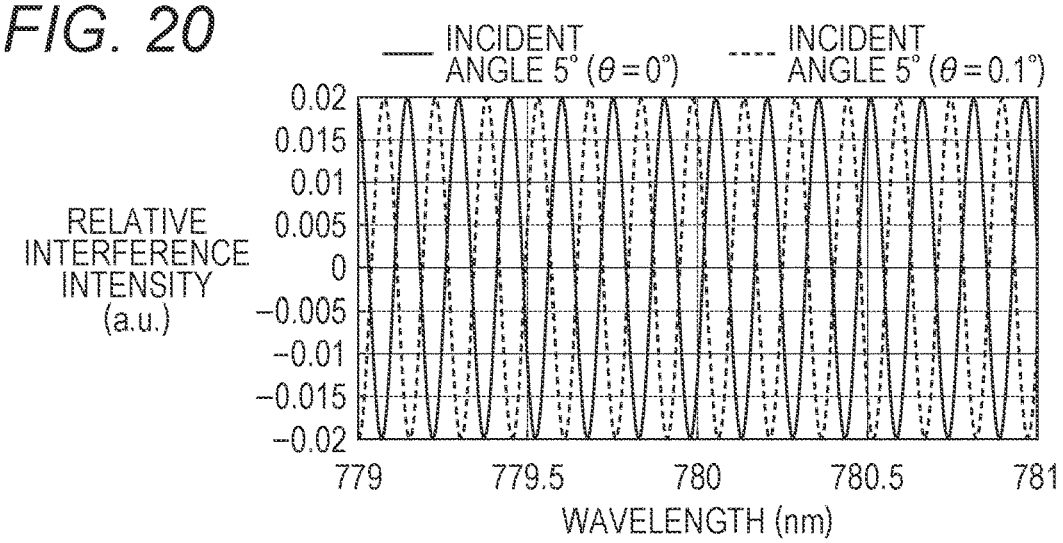
FIG. 20 is a graph illustrating relative intensity of interference light caused by third interference in a case where the incident angle of the light to be measured to the variable light attenuator is 5°.
Figure 21:
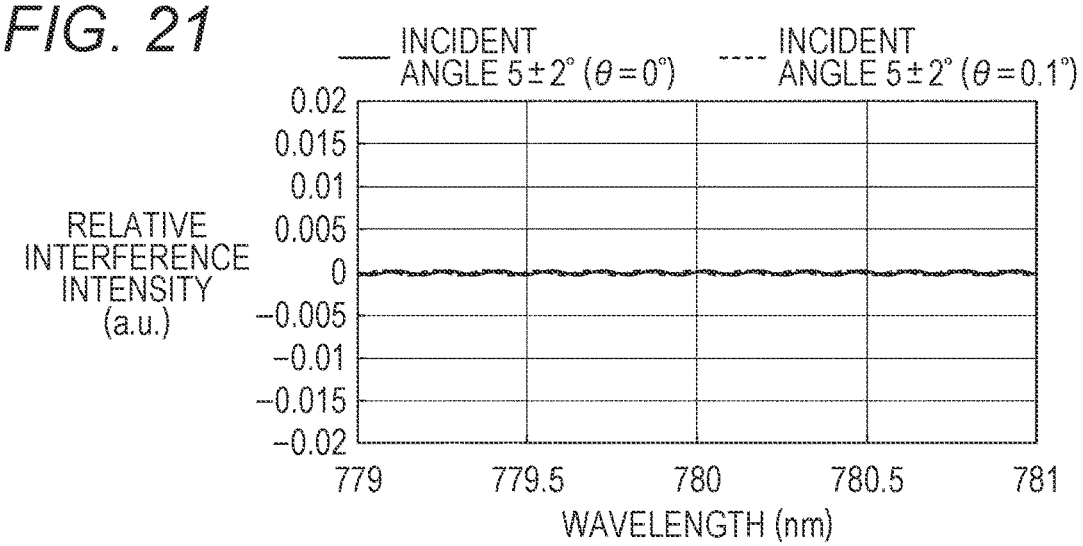
FIG. 21 is a graph illustrating relative intensity of interference light caused by third interference in a case where the incident angle range of the light to be measured to the variable light attenuator is 3° or more and 7° or less (5°±2°).
Figure 22:
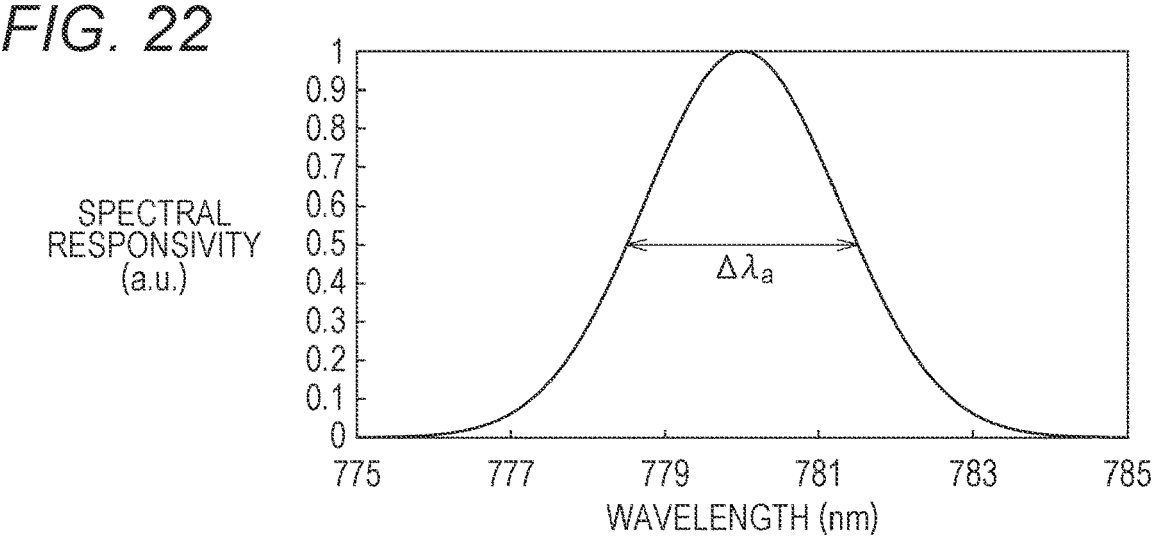
FIG. 22 is a graph illustrating a spectral responsivity spectrum of one of a plurality of photodetection elements included in the photodetector.
Figure 23:
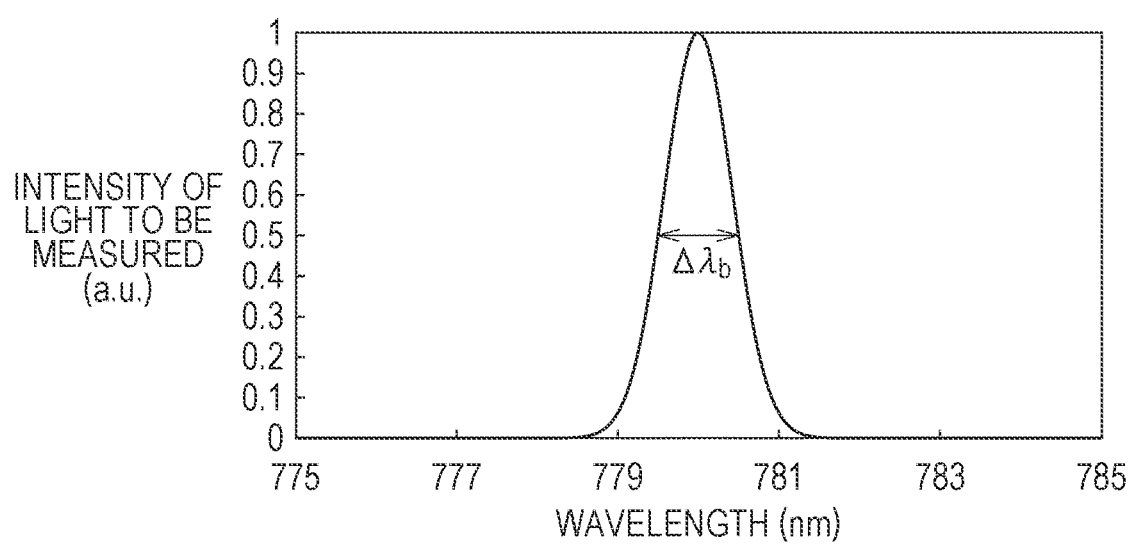
FIG. 23 is a graph illustrating a spectrum of light emitted from an object to be measured.

When the conditional expression (12) is satisfied, the variation component of the interference intensity caused by the third interference (interference between light reflected twice by the third light attenuation filter (light attenuation filter 10) and light reflected twice by the layer (for example, an air layer) between the third light attenuation filter (light attenuation filter 10) and the fourth light attenuation filter (light attenuation filter 20)) can be reduced. The measurement value measured by the photodetector 8 is given by the product of the spectrum of the relative interference intensity caused by the third interference (see FIG. 20) and the spectral responsivity spectrum of the photodetection element 9 (see FIG. 22). The left side of the conditional expression (12) indicates how many cycles of the interference waveform illustrated in FIG. 20 are included in the half value width $\Delta\lambda_a$ of the spectral responsivity spectrum of the photodetection element 9. When the conditional expression (12) is satisfied, the high averaging effect of the interference waveform can be obtained, and the variation in the interference intensity caused by the third interference can be reduced.

Specifically, the measurement value variation of the photometric device 1 due to the third interference when the relative inclination angle θ between the third light attenuation filter (light attenuation filter 10) and the fourth light attenuation filter (light attenuation filter 20) changes from 0.0° to 0.1° is 0.00%. Thus, even if the relative inclination angle θ between the third light attenuation filter and the fourth light attenuation filter slightly changes, the variation in the interference intensity caused by the third interference (interference between light reflected twice by the third light attenuation filter and light reflected twice by the layer (for example, an air layer) between the third light attenuation filter and the fourth light attenuation filter) is reduced, and the light to be measured can be accurately measured.

When the conditional expression (13) is satisfied, the variation component of the interference intensity caused by the third interference (interference between light reflected twice by the fourth light attenuation filter (light attenuation filter 20) and light reflected twice by the layer (for example, an air layer) between the third light attenuation filter (light attenuation filter 10) and the fourth light attenuation filter) can be reduced similarly to that when the conditional expression (12) is satisfied. Consequently, even if the relative inclination angle θ between the third light attenuation filter and the fourth light attenuation filter slightly changes, the interference intensity caused by the third interference hardly changes Specifically, the measurement value variation of the photometric device 1 due to the third interference when the relative inclination angle θ between the third light attenuation filter and the fourth light attenuation filter changes from 0.0° to 0.1° is 0.00%. Thus, even if the relative inclination angle θ between the third light attenuation filter and the fourth light attenuation filter slightly changes, the variation in the interference intensity caused by the third interference is reduced, and the light to be measured can be accurately measured.

The measurement value variation of the photometric device 1 of the present example is given by the sum of the measurement value variation caused by the first interference, the measurement value variation caused by the second interference, and the measurement value variation caused by the third interference. The measurement value variation of the photometric device 1 of the present example is 0.00%. When the absolute value of the measurement value variation of the photometric device 1 is within 5%, the light to be measured can be accurately measured. It is more preferable that the absolute value of the measurement value variation of the photometric device 1 is within 1%. Since the absolute value of the measurement value variation of the photometric device 1 of the present example is within 1%, the light to be measured can be accurately measured.

Example 3

The photometric device 1 of the present example is similar to the photometric device 1 of Example 1, but differs mainly in the following points. There is no distribution of the incident angles of light incident on the variable light attenuator 4, and the incident angle of light on the variable light attenuator 4 is 5° (see Table 4). The half value width $\Delta\lambda_a$ of the spectral responsivity spectrum of the photodetection element 9 is 20 un (see Table 4). The line width $\Delta\lambda_b$ of the light (light to be measured) emitted from the object to be measured 2 is 1 nm (see Table 4 and FIG. 23).

TABLE 4

| Incident angle | 5° |
|---|---|
| Half value width $\Delta\lambda_a$ | 20 nm |
| Line width $\Delta\lambda_b$ | 1 nm |

Since the line width $\Delta\lambda_b$ of the light (light to be measured) emitted from the object to be measured 2 is sufficiently smaller than the half value width $\Delta\lambda_a$ of the spectral responsivity spectrum of the photodetection element 9, the reduction in the variation component of the interference intensity caused by the interference between the plurality of multiple reflected light beams depends on (c) the line width $\Delta\lambda_b$ of the light (light to be measured) emitted from the object to be measured 2 out of (b) the half value width $\Delta\lambda_a$ of the spectral responsivity spectrum of the photodetection element 9 and (c) the line width $\Delta\lambda_b$ of the light (light to be measured) emitted from the object to be measured 2. In addition, in the present example, since there is no distribution of the incident angles of the light to be measured incident on the variable light attenuator 4, there is no reduction in the variation component of the interference intensity caused by the interference between the plurality of multiple reflected light beams due to (a) the distribution of the incident angles of the light to be measured incident on the variable light attenuator 4. In the present example, reductions in the variation component of the interference intensity caused by the first interference, the second interference, and the third interference among the plurality of multiple reflected light beams by (c) the line width $\Delta\lambda_b$ of the light (light to be measured) emitted from the object to be measured 2 will be considered.

<Reduction in Variation Component of Interference Intensity Caused by First Interference by Line Width $\Delta\lambda_b$ of Light (Light to be Measured) Emitted from Object to be Measured 2>

In the present example, the following conditional expression (3) is satisfied.

$$OPD_{13}\times(1/\lambda-1/(\lambda+\Delta\lambda_b))>0.5 \quad (3)$$

$OPD_{13}=|OP_{1220}-OP_{1022}|$. $\lambda$ is a wavelength of light included in the measurable wavelength range of the photometric device 1. $\Delta\lambda_b$ is a line width of light (light to be measured) radiated from the object to be measured 2.

$OP_{1220}$ is an optical path length of light that is reflected twice by the first light attenuation filter (light attenuation filter 10) and passes through the second light attenuation filter without being reflected by the second light attenuation filter (light attenuation filter 20) (see FIG. 5). $OP_{1022}$ is an optical path length of light that passes through the first light attenuation filter without being reflected by the first light attenuation filter and is reflected twice by the second light attenuation filter (see FIG. 5).

In the present example, when the relative inclination angle θ between the first light attenuation filter (light attenuation filter 10) and the second light attenuation filter (light attenuation filter 20) is 0.0° (see FIG. 5), the $OPD_{13}\times(1/\lambda-1/(\lambda+\Delta\lambda_a))$, which is the left side of the conditional expression (3), is 1.750. When the relative inclination angle θ between the first light attenuation filter and the second light attenuation filter is 0.1° (see FIG. 6), $OPD_{13}\times(1/\lambda-1/(\lambda+\Delta\lambda_a))$, which is the left side of the conditional expression (3), is 1.750. Therefore, the present example satisfies the conditional expression (3).

When the conditional expression (3) is satisfied, the variation component of the interference intensity caused by the first interference (interference between light reflected twice by the first light attenuation filter (light attenuation filter 10) and light reflected twice by the second light attenuation filter (light attenuation filter 20)) can be reduced. The measurement value measured by the photodetector 8 is given by the product of the spectrum of the relative interference intensity caused by the first interference (see FIG. 16) and the spectrum of the light (light to be measured) emitted from the object to be measured 2 (see FIG. 23). The left side of the conditional expression (3) indicates how many cycles of the interference waveform illustrated in FIG. 16 are included in the line width $\Delta\lambda_b$ of the light (light to be measured) emitted from the object to be measured 2 illustrated in FIG. 23. When the conditional expression (3) is satisfied, the high averaging effect of the interference waveform can be obtained, and the variation in the relative interference intensity caused by the first interference can be reduced.

Specifically, the measurement value variation of the photometric device 1 due to the first interference (interference between light reflected twice by the first light attenuation filter and light reflected twice by the second light attenuation filter) when the relative inclination angle θ between the first light attenuation filter (light attenuation filter 10) and the second light attenuation filter (light attenuation filter 20) changes from 0.0° to 0.1° is 0.00%. Thus, even if the relative inclination angle θ between the first light attenuation filter and the second light attenuation filter slightly changes, the variation in the interference intensity caused by the first interference is reduced, and the light to be measured can be accurately measured <Reduction in Variation Component of Interference Intensity Caused by Second Interference by Line Width $\Delta\lambda_b$ of Light (Light to be Measured) Emitted from Object to be Measured 2>

In the present example, the following conditional expressions (8) and (9) axe satisfied, $$OPD_{21}\times(1/\lambda-1/(\lambda+\Delta\lambda_b))>0.5 \quad (8)$$

$$OPD_{22}\times(1/\lambda-1/(\lambda+\Delta\lambda_b))>0.5 \quad (9)$$

$OPD_{21}=OP_{1420}-OP_{1022}|$. $OPD_{22}=|OP_{1024}-OP_{1220}|$.

$OP_{1420}$ is an optical path length of light that is reflected four times by the first light attenuation filter (light attenuation filter 10) and passes through the second light attenuation filter without being reflected by the second light attenuation filter (light attenuation filter 20) (see FIGS. 7 and 9) $OP_{1022}$ is an optical path length of light that passes through the first light attenuation filter without being reflected by the first light attenuation filter and is reflected twice by the second light attenuation filter (see FIGS. 7 and 9). $OP_{1024}$ is an optical path length of light that passes through the first light attenuation filter without being reflected by the first light attenuation filter and is reflected four times by the second light attenuation filter (see FIGS. 8 and 10). $OP_{1024}$ is an optical path length of light that is reflected twice by the first light attenuation filter and passes through the second light attenuation filter without being reflected by the second light attenuation filter (see FIGS. 8 and 10).

In the present example, when the relative inclination angle θ between the first light attenuation filter (light attenuation filter 10) and the second light attenuation filter (light attenuation filter 20) is 0.0° (see FIG. 7), the $OPD_{21} \times (1/\lambda - 1/(\lambda+\Delta\lambda_b))$, which is the left side of the conditional expression (8), is 1.500. When the relative inclination angle θ between the first light attenuation filter and the second light attenuation filter is 0.1° (see FIG. 9), $OPD_{21} \times (1/\lambda - 1/(\lambda+\Delta\lambda_b))$, which is the left side of the conditional expression (8), is 1.500. Therefore, the present example satisfies the conditional expression (8). When the relative inclination angle θ between the first light attenuation filter and the second light attenuation filter is 0.0° (see FIG. 8), $OPD_{12} \times (1/\lambda - 1/(\lambda+\Delta\lambda_b))$, which is the left side of the conditional expression (9), is 6.749. When the relative inclination angle θ between the first light attenuation filter and the second light attenuation filter is 0.1° (see FIG. 10), $OPD_{22} \times (1/\lambda - 1/(\lambda+\Delta\lambda_b))$, which is the left side of the conditional expression (9), is 6.749. Therefore, the present example satisfies the conditional expression (9).

When the conditional expression (8) is satisfied, the variation component of the interference intensity caused by the second interference (interference between light reflected twice by the first light attenuation filter (light attenuation filter 10) and light reflected twice by the second light attenuation filter (light attenuation filter 20)) can be reduced. The measurement value measured by the photodetector 8 is given by the product of the spectrum of the relative interference intensity caused by the second interference (see FIG. 18) and the spectrum of the light (light to be measured) emitted from the object to be measured 2 (see FIG. 23). The left side of the conditional expression (8) indicates how many cycles of the interference waveform illustrated in FIG. 18 are included in the line width $N_4$ of the light (light to be measured) emitted from the object to be measured 2 illustrated in FIG. 23. When the conditional expression (8) is satisfied, the high averaging effect of the interference waveform can be obtained, and the variation in the interference intensity caused by the second interference can be reduced.

Specifically, the measurement value variation of the photometric device 1 due to the second interference when the relative inclination angle θ between the first light attenuation filter (light attenuation filter 10) and the second light attenuation filter (light attenuation filter 20) changes from 0.0° to 0.1° is 0.00%. Thus, even if the relative inclination angle θ between the first light attenuation filter and the second light attenuation filter slightly changes, the variation in the interference intensity caused by the second interference (interference between light reflected twice by the first light attenuation filter and light reflected twice by the second light attenuation filter) is reduced, and the light to be measured can be accurately measured.

When the conditional expression (9) is satisfied, the variation component of the interference intensity caused by the second interference (interference between light reflected twice by the first light attenuation filter (light attenuation filter 10) and light reflected four times by the second light attenuation filter (light attenuation filter 20)) can be reduced similarly to that when the conditional expression (8) is satisfied. Consequently, even if the relative inclination angle θ between the first light attenuation filter and the second light attenuation filter slightly changes, the interference intensity caused by the second interference hardly changes. Specifically, the measurement value variation of the photometric device 1 due to the second interference when the relative inclination angle θ between the first light attenuation filter and the second light attenuation filter changes from 0.0° to 0.10 is 0.00%. Thus, even if the relative inclination angle θ between the first light attenuation filter and the second light attenuation filter slightly changes, the variation in the interference intensity caused by the second interference is reduced, and the light to be measured can be accurately measured.

<Reduction in Variation Component of Interference Intensity Caused by Third Interference by Line Width $\Delta\lambda_4$ of Light (Light to be Measured) Emitted from Object to be Measured 2>

In the present example, the following conditional expressions (14) and (15) are satisfied.

$$OPD_{g1} \times (1/\lambda - 1/(\lambda+\Delta\lambda_b)) > 0.5 \quad (14)$$

$$OPD_{g2} \times (1/\lambda - 1/(\lambda+\Delta\lambda_b)) > 0.5 \quad (15)$$

$OPD_{g1} = OP_{3240} - OP_{30G240}$. $OPD_{g2} = |OP_{3042} - OP_{30G240}|$.

$OP_{3240}$ is an optical path length of light that is reflected twice by the third light attenuation filter (light attenuation filter 10) and passes through the fourth light attenuation filter without being reflected by the fourth light attenuation filter (light attenuation filter 20). $OP_{30G240}$ is an optical path length of light that passes through the third light attenuation filter and the fourth light attenuation filter without being reflected by the third light attenuation filter and the fourth light attenuation filter and is reflected twice by the layer (for example, an air layer) between the third light attenuation filter and the fourth light attenuation filter. $OP_{3042}$ is an optical path length of the light that passes through the third light attenuation filter without being reflected by the third light attenuation filter and is reflected twice by the fourth light attenuation filter.

In the present example, when the relative inclination angle θ between the third light attenuation filter (light attenuation filter 10) and the fourth light attenuation filter (light attenuation filter 20) is 0.0° (see FIG. 11), $OPD_{g1} \times (1/\lambda - 1/(\lambda+\Delta\lambda_b))$, which is the left side of the conditional expression (14), is 6.562. When the relative inclination angle θ between the third light attenuation filter and the fourth light attenuation filter is 0.1° (see FIG. 13), $OPD_{g1} \times (1/\lambda - 1/(\lambda+\Delta\lambda_b))$, which is the left side of the conditional expression (14), is 6.562. Therefore, the present example satisfies the conditional expression (14). When the relative inclination angle θ between the third light attenuation filter and the fourth light attenuation filter is 0.0° (see FIG. 12), $OPD_{g1} \times (1/\lambda - 1/(\lambda+\Delta\lambda_b))$, which is the left side of the conditional expression (15), is 4.813. When the relative inclination angle θ between the third light attenuation filter and the fourth light attenuation filter is 0.1° (see FIG. 14), $OPD_{g1} \times (1/\lambda - 1/(\lambda+\Delta\lambda_b))$, which is the left side of the conditional expression (15), is 4.812. Therefore, the present example satisfies the conditional expression (15).

When the conditional expression (14) is satisfied, the variation component of the interference intensity caused by the third interference (interference between light reflected twice by the third light attenuation filter (light attenuation filter 10) and light reflected twice by the layer (for example, an air layer) between the third light attenuation filter and the fourth light attenuation filter (light attenuation filter 20)) can be reduced. The measurement value measured by the photodetector 8 is given by the product of the spectrum of the relative interference intensity caused by the third interference (see FIG. 20) and the spectrum of the light (light to be measured) emitted from the object to be measured 2 (see FIG. 23). The left side of the conditional expression (14) indicates how many cycles of the interference waveform illustrated in FIG. 20 are included in the line width $\Delta\lambda_b$ of the light (light to be measured) emitted from the object to be measured 2 illustrated in FIG. 23. When the conditional expression (14) is satisfied, the high averaging effect of the interference waveform can be obtained, and the variation in the interference intensity caused by the third interference can be reduced.

Specifically, the measurement value variation of the photometric device 1 due to the third interference when the relative inclination angle θ between the third light attenuation filter (light attenuation filter 10) and the fourth light attenuation filter (light attenuation filter 20) changes from 0.0° to 0.1° is 0.00%. Thus, even if the relative inclination angle θ between the third light attenuation filter and the fourth light attenuation filter slightly changes, the variation in the interference intensity caused by the third interference (interference between light reflected twice by the third light attenuation filter and light reflected twice by the layer (for example, an air layer) between the third light attenuation filter and the fourth light attenuation filter) is reduced, and the light to be measured can be accurately measured.

When the conditional expression (15) is satisfied, the variation component of the interference intensity caused by the third interference (interference between light reflected twice by the fourth light attenuation filter (light attenuation filter 20) and light reflected twice by the layer (for example, an air layer) between the third light attenuation filter (light attenuation filter 10) and the fourth light attenuation filter) can be reduced similarly to that when the conditional expression (14) is satisfied. Consequently, even if the relative inclination angle θ between the third light attenuation filter and the fourth light attenuation filter slightly changes, the interference intensity caused by the third interference hardly changes. Specifically, the measurement value variation of the photometric device 1 due to the third interference when the relative inclination angle θ between the third light attenuation filter and the fourth light attenuation filter changes from 0.0° to 0.1° is 0.00%. Thus, even if the relative inclination angle θ between the third light attenuation filter and the fourth light attenuation filter slightly changes, the variation in the interference intensity caused by the third interference is reduced, and the light to be measured can be accurately measured.

The measurement value variation of the photometric device 1 of the present example is given by the sum of the measurement value variation caused by the first interference, the measurement value variation caused by the second interference, and the measurement value variation caused by the third interference. The measurement value variation of the photometric device 1 of the present example is 0.00%. When the absolute value of the measurement value variation of the photometric device 1 is within 5%, the light to be measured can be accurately measured. It is more preferable that the absolute value of the measurement value variation of the photometric device 1 is within 1%. Since the absolute value of the measurement value variation of the photometric device 1 of the present example is within 1%, the light to be measured can be accurately measured.

Example 4, Example 5, and Example 6

Examples 4 to 6 will be described with reference to FIGS. 1 to 23. The photometric devices 1 of Examples 4 to 6 have configurations similar to those of the photometric devices 1 of Examples 1 to 3, but are mainly different in the following points.

The configurations of the variable light attenuators 4 of Examples 4 to 6 are as illustrated in Table 5. Thus, the optical path length of the transparent substrate 11 is different from the optical path length of the transparent substrate 21.

TABLE 5

|  | Example 4 | Example 5 | Example 6 |
|---|---|---|---|
| Thickness $d_1$ of transparent substrate 11 | 0.50 mm | 0.50 mm | 0.50 mm |
| Refractive index $n_1$ of transparent substrate 11 | 1.525 | 1.525 | 1.525 |
| Thickness $d_2$ of transparent substrate 21 | 1.00 mm | 1.00 mm | 1.00 mm |
| Refractive index $n_2$ of transparent substrate 21 | 1.525 | 1.525 | 1.525 |
| Gap G between light attenuation filter 10 and light attenuation filter 20 | 0.65 mm | 1.52 mm | 1.52 mm |

Example 4

The distribution of the incident angles of the light incident on the variable light attenuator 4 of the present example, the half value width $\Delta\lambda_a$ of the spectral responsivity spectrum of the photodetection element 9, and the line width $\Delta\lambda_b$ of the light (light to be measured) radiated from the object to be measured 2 are the same as the distribution of the incident angles of the light incident on the variable light attenuator 4 of Example 1, the half value width $\Delta\lambda_a$ of the spectral responsivity spectrum of the photodetection element 9, and the line width $\Delta\lambda_b$ of the light (light to be measured) radiated from the object to be measured 2, respectively (see Table 2). Thus, in the present example, as in Example 1, the reductions in the variation component of the interference intensity caused by the first interference, the second interference, and the third interference among the plurality of multiple reflected light beams by (a) the distribution of the incident angles of the light to be measured incident on the variable light attenuator 4 will be considered.

<Reduction in Variation Component of Interference Intensity Caused by First Interference Due to Distribution of Incident Angles of Light to Be Measured Incident on Variable Light Attenuator 4>

In the present example, when the relative inclination angle θ between the first light attenuation filter (light attenuation filter 10) and the second light attenuation filter (light attenuation filter 20) is 0.0° (see FIG. 5), $|OPD_{\theta max1} - OPD_{\theta min1}|/\lambda$, which is the left side of the conditional expression (1), is 5.101. When the relative inclination angle θ between the first light attenuation filter and the second light attenuation filter is 0.1° (see FIG. 6), $|OPD_{\theta max1} - OPD_{\theta min1}|/\lambda$, which is the left side of the conditional expression (1), is 4.898. Therefore, the present example satisfies the conditional expression (1). The measurement value variation of the photometric device 1 due to the first interference (interference between light reflected twice by the first light attenuation filter and light reflected twice by the second light attenuation filter) when the relative inclination angle θ between the first light attenuation filter and the second light attenuation filter changes from 0.0° to 0.1° is −0.03%.

<Reduction in Variation Component of Interference Intensity Caused by Second Interference Due to Distribution of Incident Angles of Light to Be Measured Incident on Variable Light Attenuator 4>

In the present example, when the relative inclination angle θ between the first light attenuation filter (light attenuation filter 10) and the second light attenuation filter (light attenuation filter 20) is 0.0° (see FIG. 7), $|OPD_{\theta max2}-OPD_{\theta min2}|/\lambda$, which is the left side of the conditional expression (4), is 0.000. When the relative inclination angle θ between the first light attenuation filter and the second light attenuation filter is 0.1° (see FIG. 9), $|OPD_{\theta max2}-OPD_{\theta min2}|/\lambda$, which is the left side of the conditional expression (4), is 0.203. Therefore, the present example does not satisfy the conditional expression (4). The measurement value variation of the photometric device 1 due to the second interference (interference between light reflected four times by the first light attenuation filter and light reflected twice by the second light attenuation filter) when the relative inclination angle θ between the first light attenuation filter and the second light attenuation filter changes from 0.0° to 0.1° is −0.20%.

When the relative inclination angle θ between the first light attenuation filter (light attenuation filter 10) and the second light attenuation filter (light attenuation filter 20) is 0.0° (see FIG. 8), $|OPD_{\theta max3}-OPD_{\theta min3}|/\lambda$, which is the left side of the conditional expression (5), is 15.303. When the relative inclination angle θ between the first light attenuation filter and the second light attenuation filter is 0.1° (see FIG. 10). $|OPD_{\theta max3}-OPD_{\theta min3}|/\lambda$, which is the left side of the conditional expression (5), is 14.897. Therefore, the present example satisfies the conditional expression (5). The measurement value variation of the photometric device 1 due to the second interference (interference between light reflected twice by the first light attenuation filter and light reflected four times by the second light attenuation filter) when the relative inclination angle θ between the first light attenuation filter and the second light attenuation filter changes from 0.0° to 0.1° is 0.00%.

<Reduction in Variation Component of Interference Intensity Caused by Third Interference Due to Distribution of Incident Angles of Light to be Measured Incident on Variable Light Attenuator 4>

In the present example, when the relative inclination angle θ between the third light attenuation filter (light attenuation filter 10) and the fourth light attenuation filter (light attenuation filter 20) is 0.0° (see FIG. 13), $|OPD_{\theta max4}-OPD_{\theta min4}|/\lambda$, which is the left side of the conditional expression (10), is 5.038. When the relative inclination angle θ between the third light attenuation filter and the fourth light attenuation filter is 0.1° (see FIG. 16). $|OPD_{\theta max4}-OPD_{\theta min4}|/\lambda$, which is the left side of the conditional expression (10), is 5.243. Therefore, the present example satisfies the conditional expression (10). The measurement value variation of the photometric device 1 due to the third interference (interference between light reflected twice by the third light attenuation filter and light reflected twice by the layer (for example, an air layer) between the third light attenuation filter and the fourth light attenuation filter) when the relative inclination angle θ between the third light attenuation filter and the fourth light attenuation filter changes from 0.0° to 0.1° is 0.03%.

When the relative inclination angle θ between the third light attenuation filter (light attenuation filter 10) and the fourth light attenuation filter (light attenuation filter 20) is 0.0° (see FIG. 12), $|OPD_{\theta max5}-OPD_{\theta min5}|$, which is the left side of the conditional expression (11), is 0.063. When the relative inclination angle θ between the third light attenuation filter and the fourth light attenuation filter is 0.1° (see FIG. 10), $|OPD_{\theta max5}-OPD_{\theta min5}|$, which is the left side of the conditional expression (11), is 0.244. Therefore, the present example does not satisfy the conditional expression (11). The measurement value variation of the photometric device 1 due to the third interference (interference between light reflected twice by the fourth light attenuation filter and light reflected twice by the layer (for example, an air layer) between the third light attenuation filter and the fourth light attenuation filter) when the relative inclination angle θ between the third light attenuation filter and the fourth light attenuation filter changes from 0.0° to 0.1° is −2.04%.

The measurement value variation of the photometric device 1 of the present example is given by the sum of the measurement value variation caused by the first interference, the measurement value variation caused by the second interference, and the measurement value variation caused by the third interference. The measurement value variation of the photometric device 1 of the present example is −2.24%. Since the absolute value of the measurement value variation of the photometric device 1 of the present example is within 5%, the light to be measured can be accurately measured. The absolute value of the measurement value variation of the photometric device 1 of the present example is larger than the absolute value of the measurement value variation of the photometric device 1 of Example 1. Thus, the photometric device 1 of Example 1 is more desirable than the photometric device 1 of the present example.

Example 5

The incident angle of light on the variable light attenuator 4, the half value width $\Delta\lambda_a$ of the spectral responsivity spectrum of the photodetection element 9, and the line width $\Delta\lambda_b$ of light (light to be measured) emitted from the object to be measured 2 of the present example are the same as the incident angle of light on the variable light attenuator 4, the half value width $\Delta\lambda_a$ of the spectral responsivity spectrum of the photodetection element 9, and the line width $\Delta\lambda_b$ of light (light to be measured) emitted from the object to be measured 2 of Example 2, respectively (see Table 3). Thus, in the present example, as in Example 2, the reductions in the variation component of the interference intensity caused by the first interference, the second interference, and the third interference among the plurality of multiple reflected light beams by (b) the half value width $\Delta\lambda_a$ of the spectral responsivity spectrum of the photodetection element 9 will be considered.

<Reduction in Variation Component of Interference Intensity Caused by First Interference by Half Value Width $\Delta\lambda_a$ of Spectral Responsivity Spectrum of Photodetection Element 9>

In the present example, when the relative inclination angle θ between the first light attenuation filter (light attenuation filter 10) and the second light attenuation filter (light attenuation filter 20) is 0.0° (see FIG. 5), the $OPD_{12} \times (1/\lambda - 1/(\lambda+\Delta\lambda_a))$, which is the left side of the conditional expression (2), is 7.479. When the relative inclination angle θ between the first light attenuation filter and the second light attenuation filter is 0.1° (see FIG. 6), $OPD_{12} \times (1/\lambda - 1/(\lambda+\Delta\lambda_a))$, which is the left side of the conditional expression (2), is 7.480. Therefore, the present example satisfies the conditional expression (2). The measurement value variation of the photometric device 1 due to the first interference (interference between light reflected twice by the first light attenuation filter and light reflected twice by the second light attenuation filter) when the relative inclination angle θ between the first light attenuation filter and the second light attenuation filter changes from 0.0° to 0.1° is 0.00%.

<Reduction in Variation Component of Interference Intensity Caused by Second Interference by Half Value Width $\Delta\lambda_a$ of Spectral Responsivity Spectrum of Photodetection Element 9>

In the present example, when the relative inclination angle θ between the first light attenuation filter (light attenuation filter 10) and the second light attenuation filter (light attenuation filter 20) is 0.0° (see FIG. 7), the $\text{OPD}_{21} \times (1/\lambda - 1/(\lambda+\Delta\lambda_a))$, which is the left side of the conditional expression (6), is 0.000. When the relative inclination angle θ between the first light attenuation filter and the second light attenuation filter is 0.1° (see FIG. 9), $\text{OPD}_{21} \times (1/\lambda - 1/(\lambda+\Delta\lambda_a))$, which is the left side of the conditional expression (6), is 0.001. Therefore, the present example does not satisfy the conditional expression (6). The measurement value variation of the photometric device 1 due to the second interference (interference between light reflected four times by the first light attenuation filter and light reflected twice by the second light attenuation filter) when the relative inclination angle θ between the first light attenuation filter and the second light attenuation filter changes from 0.0° to 0.1° is −0.20%.

When the relative inclination angle θ between the first light attenuation filter (light attenuation filter 10) and the second light attenuation filter (light attenuation filter 20) is 0.0° (see FIG. 8), the $\text{OPD}_{21} \times (1/\lambda - 1/(\lambda+\Delta\lambda_a))$, which is the left side of the conditional expression (7), is 22.438. When the relative inclination angle θ between the first light attenuation filter and the second light attenuation filter is 0.1° (see FIG. 10), $\text{OPD}_{21} \times (1/\lambda - 1/(\lambda+\Delta\lambda_a))$, which is the left side of the conditional expression (7), is 22.440. Therefore, the present example satisfies the conditional expression (7). The measurement value variation of the photometric device 1 due to the second interference (interference between light reflected twice by the first light attenuation filter and light reflected four times by the second light attenuation filter) when the relative inclination angle θ between the first light attenuation filter and the second light attenuation filter changes from 0.0° to 0.1° is 0.00%.

<Reduction in Variation Component of Interference Intensity Caused by Third Interference by Half Value Width $\Delta\lambda_a$ of Spectral Responsivity Spectrum of Photodetection Element 9>

In the present example, when the relative inclination angle θ between the third light attenuation filter (light attenuation filter 10) and the fourth light attenuation filter (light attenuation filter 20) is 0.0° (see FIG. 11), $\text{OPD}_{g1} \times (1/\lambda - 1/(\lambda+\Delta\lambda_a))$, which is the left side of the conditional expression (12), is 7.397. When the relative inclination angle θ between the third light attenuation filter and the fourth light attenuation filter is 0.1° (see FIG. 13). $\text{OPD}_{g1} \times (1/\lambda - 1/(\lambda+\Delta\lambda_a))$, which is the left side of the conditional expression (12), is 7.395. Therefore, the present example satisfies the conditional expression (12). The measurement value variation of the photometric device 1 due to the third interference (interference between light reflected twice by the third light attenuation filter and light reflected twice by the layer (for example, an air layer) between the third light attenuation filter and the fourth light attenuation filter) when the relative inclination angle θ between the third light attenuation filter and the fourth light attenuation filter changes from 0.0° to 0.1° is 0.00%.

When the relative inclination angle θ between the third light attenuation filter (light attenuation filter 10) and the fourth light attenuation filter (light attenuation filter 20) is 0.0° (see FIG. 12), $\text{OPD}_{g2} \times (1/\lambda - 1/(\lambda+\Delta\lambda_a))$, which is the left side of the conditional expression (13), is 0.083. When the relative inclination angle θ between the third light attenuation filter and the fourth light attenuation filter is 0.1° (see FIG. 14), $\text{OPD}_{g2} \times (1/\lambda - 1/(\lambda+\Delta\lambda_a))$, which is the left side of the conditional expression (13), is 0.085. Therefore, the present example does not satisfy the conditional expression (13). The measurement value variation of the photometric device 1 due to the third interference (interference between light reflected twice by the fourth light attenuation filter and light reflected twice by the layer (for example, an air layer) between the third light attenuation filter and the fourth light attenuation filter) when the relative inclination angle θ between the third light attenuation filter and the fourth light attenuation filter changes from 0.0° to 0.1° is 1.37%.

The measurement value variation of the photometric device 1 of the present example is given by the sum of the measurement value variation caused by the first interference, the measurement value variation caused by the second interference, and the measurement value variation caused by the third interference. The measurement value variation of the photometric device 1 of the present example is 1.16%. Since the absolute value of the measurement value variation of the photometric device 1 of the present example is within 5%, the light to be measured can be accurately measured. The absolute value of the measurement value variation of the photometric device 1 of the present example is larger than the absolute value of the measurement value variation of the photometric device 1 of Example 2. Thus, the photometric device 1 of Example 2 is more desirable than the photometric device 1 of the present example.

Example 6

The incident angle of light on the variable light attenuator 4, the half value width $\Delta\lambda_a$ of the spectral responsivity spectrum of the photodetection element 9, and the line width $\Delta\lambda_b$ of light (light to be measured) emitted from the object to be measured 2 of the present example are the same as the incident angle of light on the variable light attenuator 4, the half value width $\Delta\lambda_a$ of the spectral responsivity spectrum of the photodetection element 9, and the line width $\Delta\lambda_b$ of light (light to be measured) emitted from the object to be measured 2 of Example 3, respectively (see Table 4). Thus, in the present example, as in Example 3, the reductions in the variation component of the interference intensity caused by the first interference, the second interference, and the third interference among the plurality of multiple reflected light beams by (c) the line width $\Delta\lambda_b$ of the light (light to be measured) emitted from the object to be measured 2 will be considered.

<Reduction in Variation Component of Interference Intensity Caused by First Interference by Line Width $\Delta\lambda_b$ of Light (Light to be Measured) Emitted from Object to be Measured 2>

In the present example, when the relative inclination angle θ between the first light attenuation filter (light attenuation filter 10) and the second light attenuation filter (light attenuation filter 20) is 0.0° (see FIG. 5), the $\text{OPD}_3 \times (1/\lambda - 1/(\lambda+\Delta\lambda_b))$, which is the left side of the conditional expression (3), is 2.500. When the relative inclination angle θ between the first light attenuation filter and the second light attenuation filter is 0.1° (see FIG. 6), $\text{OPD}_{13} \times (1/\lambda - 1/(\lambda+\Delta\lambda_b))$, which is the left side of the conditional expression (3), is 2.500 Therefore, the present example satisfies the conditional expression (3). The measurement value variation of the photometric device 1 due to the first interference (interference between light reflected twice by the first light attenuation filter and light reflected twice by the second light attenuation filter) when the relative inclination angle θ between the first light attenuation filter and the second light attenuation filter changes from 0.0° to 0.1° is 0.00%.

<Reduction in Variation Component of Interference Intensity Caused by Second Interference by Line Width $\Delta\lambda_b$ of Light (Light to be Measured) Emitted from Object to be Measured 2>

In the present example, when the relative inclination angle θ between the first light attenuation filter (light attenuation filter 10) and the second light attenuation filter (light attenuation filter 20) is 0.0° (see FIG. 7), the $OPD_{21} \times (1/\lambda - 1/(\lambda+\Delta\lambda_b))$, which is the left side of the conditional expression (8), is 0.000 When the relative inclination angle θ between the first light attenuation filter and the second light attenuation filter is 0° (see FIG. 9), $OPD_{21} \times (1/\lambda - 1/(\lambda+\Delta\lambda_b))$, which is the left side of the conditional expression (8), is 0.000 Therefore, the present example does not satisfy the conditional expression (8). The measurement value variation of the photometric device 1 due to the second interference (interference between light reflected four times by the first light attenuation filter and light reflected twice by the second light attenuation filter) when the relative inclination angle θ between the first light attenuation filter and the second light attenuation filter changes from 0.0° to 0.1° is −0.20%.

When the relative inclination angle θ between the first light attenuation filter (light attenuation filter 10) and the second light attenuation filter (light attenuation filter 20) is 0.0° (see FIG. 8), the $OPD_{22} \times (1/\lambda - 1/(\lambda+\Delta\lambda_b))$, which is the left side of the conditional expression (9), is 7.499. When the relative inclination angle θ between the first light attenuation filter and the second light attenuation filter is 0.1° (see FIG. 10), $OPD_2 \times (1/\lambda - 1/(\lambda+\Delta\lambda_b))$, which is the left side of the conditional expression (9), is 7.499. Therefore, the present example satisfies the conditional expression (9). The measurement value variation of the photometric device 1 due to the second interference (interference between light reflected twice by the first light attenuation filter and light reflected four times by the second light attenuation filter) when the relative inclination angle θ between the first light attenuation filter and the second light attenuation filter changes from 0.0° to 0.1° is 0.00%.

<Reduction in Variation Component of Interference Intensity Caused by Third Interference by Line Width $\Delta\lambda_4$ of Light (Light to be Measured) Emitted from Object to be Measured 2>

Figure 11:
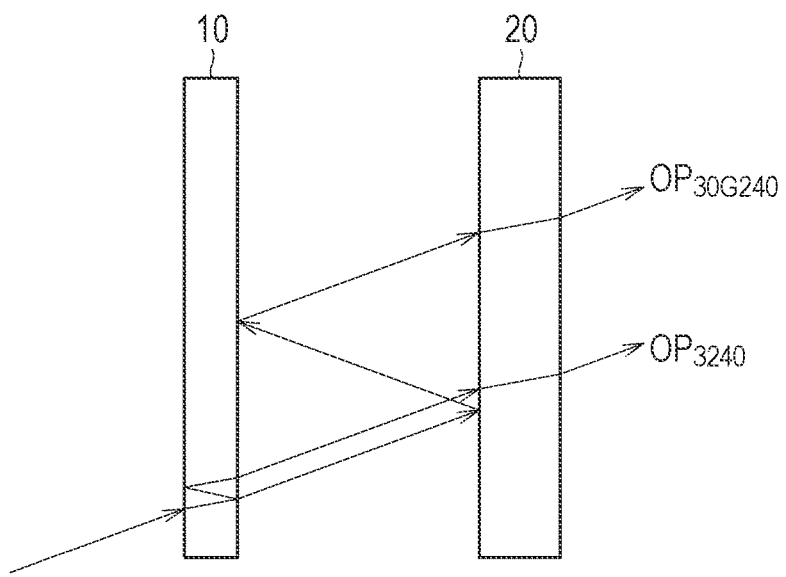
FIG. 11 is a schematic diagram illustrating third interference in the variable light attenuator of the embodiment.

In the present example, when the relative inclination angle θ between the third light attenuation filter (light attenuation filter 10) and the fourth light attenuation filter (light attenuation filter 20) is 0.0° (see FIG. 11). $OPD_{g1} \times (1/\lambda - 1/(\lambda+\Delta\lambda_b))$, which is the left side of the conditional expression (14), is 2.472. When the relative inclination angle θ between the third light attenuation filter and the fourth light attenuation filter is 0.1° (see FIG. 13), $OPD_{g1} \times (1/\lambda - 1/(\lambda+\Delta\lambda_b))$, which is the left side of the conditional expression (14), is 2.471. Therefore, the present example satisfies the conditional expression (14). The measurement value variation of the photometric device 1 due to the third interference (interference between light reflected twice by the third light attenuation filter and light reflected twice by the layer (for example, an air layer) between the third light attenuation filter and the fourth light attenuation filter) when the relative inclination angle θ between the third light attenuation filter and the fourth light attenuation filter changes from 0.0° to 0.1° is 0.00%.

When the relative inclination angle θ between the third light attenuation filter (light attenuation filter 10) and the fourth light attenuation filter (light attenuation filter 20) is 0.0° (see FIG. 12), $OPD_{g1} \times (1/\lambda - 1/(\lambda+\Delta\lambda_b))$, which is the left side of the conditional expression (15), is 0.028. When the relative inclination angle θ between the third light attenuation filter and the fourth light attenuation filter is 0.1° (see FIG. 14), $OPD_{g1} \times (1/\lambda - 1/(\lambda+\Delta\lambda_b))$, which is the left side of the conditional expression (15), is 0.028. Therefore, the present example does not satisfy the conditional expression (15). The measurement value variation of the photometric device 1 due to the third interference (interference between light reflected twice by the fourth light attenuation filter and light reflected twice by the layer (for example, an air layer) between the third light attenuation filter and the fourth light attenuation filter) when the relative inclination angle θ between the third light attenuation filter and the fourth light attenuation filter changes from 0.0° to 0.1° is 2.30%.

The measurement value variation of the photometric device 1 of the present example is given by the sum of the measurement value variation caused by the first interference, the measurement value variation caused by the second interference, and the measurement value variation caused by the third interference. The measurement value variation of the photometric device 1 of the present example is 2.10%. Since the absolute value of the measurement value variation of the photometric device 1 of the present example is within 5%, the light to be measured can be accurately measured. The absolute value of the measurement value variation of the photometric device 1 of the present example is larger than the absolute value of the measurement value variation of the photometric device 1 of Example 3. Thus, the photometric device 1 of Example 3 is more desirable than the photometric device 1 of the present example.

Example 7, Example 8, and Example 9

Examples 7 to 9 will be described with reference to FIGS. 1 to 23. The photometric devices 1 of Examples 7 to 9 have configurations similar to those of the photometric devices 1 of Examples 1 to 3, but are mainly different in the following points.

The configurations of the variable light attenuators 4 of Examples 7 to 9 are as illustrated in Table 6. Thus, the optical path length of the transparent substrate 11 is different from the optical path length of the transparent substrate 21.

TABLE 6

| | Example 7 | Example 8 | Example 9 |
|---|---|---|---|
| Thickness $d_1$ of transparent substrate 11 | 0.80 mm | 0.80 mm | 0.80 mm |
| Refractive index $n_1$ of transparent substrate 11 | 1.525 | 1.525 | 1.525 |
| Thickness $d_2$ of transparent substrate 21 | 1.00 mm | 1.00 mm | 1.00 mm |
| Refractive index $n_2$ of transparent substrate 21 | 1.525 | 1.525 | 1.525 |
| Gap G between light attenuation filter 10 and light attenuation filter 20 | 0.50 mm | 1.25 mm | 1.25 mm |

Example 7

The distribution of the incident angles of the light incident on the variable light attenuator 4 of the present example, the half value width $\Delta\lambda_a$ of the spectral responsivity spectrum of the photodetection element 9, and the line width $\Delta\lambda_b$ of the light (light to be measured) radiated from the object to be measured 2 are the same as the distribution of the incident angles of the light incident on the variable light attenuator 4 of Example 1, the half value width $\Delta\lambda_a$ of the spectral responsivity spectrum of the photodetection element 9, and the line width $\Delta\lambda_b$ of the light (light to be measured) radiated from the object to be measured 2, respectively (see Table 2). Thus, in the present example, as in Example 1, the reductions in the variation component of the interference intensity caused by the first interference, the second interference, and the third interference among the plurality of multiple reflected light beams by (a) the distribution of the incident angles of the light to be measured incident on the variable light attenuator 4 will be considered.

<Reduction in Variation Component of Interference Intensity Caused by First Interference Due to Distribution of Incident Angles of Light to be Measured Incident on Variable Light Attenuator 4>

In the present example, when the relative inclination angle θ between the first light attenuation filter (light attenuation filter 10) and the second light attenuation filter (light attenuation filter 20) is 0.0° (see FIG. 5), $|OPD_{\theta max1} - OPD_{\theta min1}|/\lambda$, which is the left side of the conditional expression (1), is 2.040. When the relative inclination angle θ between the first light attenuation filter and the second light attenuation filter is 0.1° (see FIG. 6). $|OPD_{\theta max1} - OPD_{\theta min1}|/\lambda$, which is the left side of the conditional expression (1), is 1.838. Therefore, the present example satisfies the conditional expression (1). The measurement value variation of the photometric device 1 due to the first interference (interference between light reflected twice by the first light attenuation filter and light reflected twice by the second light attenuation filter) when the relative inclination angle θ between the first light attenuation filter and the second light attenuation filter changes from 0.0° to 0.1° is −0.05%.

<Reduction in Variation Component of Interference Intensity Caused by Second Interference Due to Distribution of Incident Angles of Light to be Measured Incident on Variable Light Attenuator 4>

In the present example, when the relative inclination angle θ between the first light attenuation filter (light attenuation filter 10) and the second light attenuation filter (light attenuation filter 20) is 0.0° (see FIG. 7), $|OPD_{\theta max2} - OPD_{\theta min2}|/\lambda$, which is the left side of the conditional expression (4), is 6.121. When the relative inclination angle θ between the first light attenuation filter and the second light attenuation filter is 0° (see FIG. 9), $|OPD_{\theta max2} - OPD_{\theta min2}|/\lambda$, which is the left side of the conditional expression (4), is 5.797. Therefore, the present example satisfies the conditional expression (4). The measurement value variation of the photometric device 1 due to the second interference (interference between light reflected four times by the first light attenuation filter and light reflected twice by the second light attenuation filter) when the relative inclination angle θ between the first light attenuation filter and the second light attenuation filter changes from 0.0° to 0.1° is 0.00%.

When the relative inclination angle θ between the first light attenuation filter (light attenuation filter 10) and the second light attenuation filter (light attenuation filter 20) is 0.0° (see FIG. 8), $|OPD_{\theta min3} - OPD_{\theta min3}|/\lambda$, which is the left side of the conditional expression (5), is 12.242. When the relative inclination angle θ between the first light attenuation filter and the second light attenuation filter is 0.1° (see FIG. 10), $|OPD_{\theta max3} - OPD_{\theta min3}|/\Delta$, which is the left side of the conditional expression (5), is 11.837. Therefore, the present example satisfies the conditional expression (5). The measurement value variation of the photometric device 1 due to the second interference (interference between light reflected twice by the first light attenuation filter and light reflected four times by the second light attenuation filter) when the relative inclination angle θ between the first light attenuation filter and the second light attenuation filter changes from 0.0° to 0.1° is 00%.

<Reduction in Variation Component of Interference Intensity Caused by Third Interference Due to Distribution of Incident Angles of Light to be Measured Incident on Variable Light Attenuator 4>

In the present example, when the relative inclination angle θ between the third light attenuation filter (light attenuation filter 10) and the fourth light attenuation filter (light attenuation filter 20) is 0.0° (see FIG. 13), $|OPD_{\theta max4} - OPD_{\theta min4}|/\lambda$, which is the left side of the conditional expression (10), is 0.362. When the relative inclination angle θ between the third light attenuation filter and the fourth light attenuation filter is 0.1° (see FIG. 16). $|OPD_{\theta max4} - OPD_{\theta min4}|/\lambda$, which is the left side of the conditional expression (10), is 0.120. Therefore, the present example does not satisfy the conditional expression (10). The measurement value variation of the photometric device 1 due to the third interference (interference between light reflected twice by the third light attenuation filter and light reflected twice by the layer (for example, an air layer) between the third light attenuation filter and the fourth light attenuation filter) when the relative inclination angle θ between the third light attenuation filter and the fourth light attenuation filter changes from 0.0° to 0.1° is −2.41%.

When the relative inclination angle θ between the third light attenuation filter (light attenuation filter 10) and the fourth light attenuation filter (light attenuation filter 20) is 0.0° (see FIG. 12), $|OPD_{\theta max5} - OPD_{\theta min5}|$, which is the left side of the conditional expression (11), is 2.402. When the relative inclination angle θ between the third light attenuation filter and the fourth light attenuation filter is 0.1° (see FIG. 10), $|OPD_{\theta max5} - OPD_{\theta min5}|$, which is the left side of the conditional expression (11), is 2.120. Therefore, the present example satisfies the conditional expression (11). The measurement value variation of the photometric device 1 due to the third interference (interference between light reflected twice by the fourth light attenuation filter and light reflected twice by the layer (for example, an air layer) between the third light attenuation filter and the fourth light attenuation filter) when the relative inclination angle θ between the third light attenuation filter and the fourth light attenuation filter changes from 0.0° to 0.1° is 0.07%

The measurement value variation of the photometric device 1 of the present example is given by the sum of the measurement value variation caused by the first interference, the measurement value variation caused by the second interference, and the measurement value variation caused by the third interference. The measurement value variation of the photometric device 1 of the present example is −2.39%. Since the absolute value of the measurement value variation of the photometric device 1 of the present example is within 5%, the light to be measured can be accurately measured. The absolute value of the measurement value variation of the photometric device 1 of the present example is larger than the absolute value of the measurement value variation of the photometric device 1 of Example 1. Thus, the photometric device 1 of Example 1 is more desirable than the photometric device 1 of the present example Example 8

The incident angle of light on the variable light attenuator 4, the half value width $\Delta\lambda_a$ of the spectral responsivity spectrum of the photodetection element 9, and the line width $\Delta\lambda_b$ of light (light to be measured) emitted from the object to be measured 2 of the present example are the same as the incident angle of light on the variable light attenuator 4, the half value width $\Delta\lambda_a$ of the spectral responsivity spectrum of the photodetection element 9, and the line width $\Delta\lambda_b$ of light (light to be measured) emitted from the object to be measured 2 of Example 2, respectively (see Table 3). Thus, in the present example, as in Example 2, the reductions in the variation component of the interference intensity caused by the first interference, the second interference, and the third interference among the plurality of multiple reflected light beams by (b) the half value width $\Delta\lambda_a$ of the spectral responsivity spectrum of the photodetection element 9 will be considered <Reduction in Variation Component of Interference Intensity Caused by First Interference by Half Value Width $\Delta\lambda_a$ of Spectral Responsivity Spectrum of Photodetection Element 9>

In the present example, when the relative inclination angle θ between the first light attenuation filter (light attenuation filter 10) and the second light attenuation filter (light attenuation filter 20) is 0.0° (see FIG. 5), the $OPD_{12} \times (1/\lambda - 1/(\lambda+\Delta\lambda_a))$, which is the left side of the conditional expression (2), is 2.992. When the relative inclination angle θ between the first light attenuation filter and the second light attenuation filter is 0.1° (see FIG. 6), $OPD_{12} \times (1/\lambda - 1/(\lambda+\Delta\lambda_a))$, which is the left side of the conditional expression (2), is 2.993. Therefore, the present example satisfies the conditional expression (2). The measurement value variation of the photometric device 1 due to the first interference (interference between light reflected twice by the first light attenuation filter and light reflected twice by the second light attenuation filter) when the relative inclination angle θ between the first light attenuation filter and the second light attenuation filter changes from 0.0° to 0.1° is 0.00%

<Reduction in Variation Component of Interference Intensity Caused by Second Interference by Half Value Width $\Delta\lambda_a$ of Spectral Responsivity Spectrum of Photodetection Element 9>

In the present example, when the relative inclination angle θ between the first light attenuation filter (light attenuation filter 10) and the second light attenuation filter (light attenuation filter 20) is 0.0° (see FIG. 7), the $OPD_{21} \times (1/\lambda - 1/(\lambda+\Delta\lambda_a))$, which is the left side of the conditional expression (6), is 8.975. When the relative inclination angle θ between the first light attenuation filter and the second light attenuation filter is 0.1° (see FIG. 9), $OPD_{21} \times (1/\lambda - 1/(\lambda+\Delta\lambda_a))$, which is the left side of the conditional expression (6), is 8.977. Therefore, the present example satisfies the conditional expression (6). The measurement value variation of the photometric device 1 due to the second interference (interference between light reflected four times by the first light attenuation filter and light reflected twice by the second light attenuation filter) when the relative inclination angle θ between the first light attenuation filter and the second light attenuation filter changes from 0.0° to 0.1° is 0.00%.

When the relative inclination angle θ between the first light attenuation filter (light attenuation filter 10) and the second light attenuation filter (light attenuation filter 20) is 0.0° (see FIG. 8), the $OPD_{21} \times (1/\lambda - 1/(\lambda+\Delta\lambda_a))$, which is the left side of the conditional expression (7), is 17.950. When the relative inclination angle θ between the first light attenuation filter and the second light attenuation filter is 0.1° (see FIG. 10), $OPD_1 \times (1/\lambda - 1/(\lambda+\Delta\lambda_a))$, which is the left side of the conditional expression (7), is 17.952. Therefore, the present example satisfies the conditional expression (7). The measurement value variation of the photometric device 1 due to the second interference (interference between light reflected twice by the first light attenuation filter and light reflected four times by the second light attenuation filter) when the relative inclination angle θ between the first light attenuation filter and the second light attenuation filter changes from 0.0° to 0.1° is 0.00%.

<Reduction in Variation Component of Interference Intensity Caused by Third Interference by Half Value Width $\Delta\lambda_a$ of Spectral Responsivity Spectrum of Photodetection Element 9>

In the present example, when the relative inclination angle θ between the third light attenuation filter (light attenuation filter 10) and the fourth light attenuation filter (light attenuation filter 20) is 0.0° (see FIG. 11), $OPD_{g1} \times (1/\lambda - 1/(\lambda+\Delta\lambda_a))$, which is the left side of the conditional expression (12), is 0.266. When the relative inclination angle θ between the third light attenuation filter and the fourth light attenuation filter is 0.1° (see FIG. 13), $OPD_{g1} \times (1/\lambda - 1/(\lambda+\Delta\lambda_a))$, which is the left side of the conditional expression (12), is 0.265. Therefore, the present example does not satisfy the conditional expression (12). The measurement value variation of the photometric device 1 due to the third interference (interference between light reflected twice by the third light attenuation filter and light reflected twice by the layer (for example, an air layer) between the third light attenuation filter and the fourth light attenuation filter) when the relative inclination angle θ between the third light attenuation filter and the fourth light attenuation filter changes from 0.0° to 0.1° is 2.74%.

When the relative inclination angle θ between the third light attenuation filter (light attenuation filter 10) and the fourth light attenuation filter (light attenuation filter 20) is 0.0° (see FIG. 12), $OPD_{g2} \times (1/\lambda - 1/(\lambda+\Delta\lambda_a))$, which is the left side of the conditional expression (13), is 2.725. When the relative inclination angle θ between the third light attenuation filter and the fourth light attenuation filter is 0.1° (see FIG. 14), $OPD_{g2} \times (1/\lambda - 1/(\lambda+\Delta\lambda_a))$, which is the left side of the conditional expression (13), is 2.727. Therefore, the present example satisfies the conditional expression (13). The measurement value variation of the photometric device 1 due to the third interference (interference between light reflected twice by the fourth light attenuation filter and light reflected twice by the layer (for example, an air layer) between the third light attenuation filter and the fourth light attenuation filter) when the relative inclination angle θ between the third light attenuation filter and the fourth light attenuation filter changes from 0.0° to 0.1° is 0.00%.

The measurement value variation of the photometric device 1 of the present example is given by the sum of the measurement value variation caused by the first interference, the measurement value variation caused by the second interference, and the measurement value variation caused by the third interference. The measurement value variation of the photometric device 1 of the present example is 2.74%. Since the absolute value of the measurement value variation of the photometric device 1 of the present example is within 5%, the light to be measured can be accurately measured. The absolute value of the measurement value variation of the photometric device 1 of the present example is larger than the absolute value of the measurement value variation of the photometric device 1 of Example 2. Thus, the photometric device 1 of Example 2 is more desirable than the photometric device 1 of the present example Example 9

The incident angle of light on the variable light attenuator 4, the half value width $\Delta\lambda_a$ of the spectral responsivity spectrum of the photodetection element 9, and the line width $\Delta\lambda_b$ of light (light to be measured) emitted from the object to be measured 2 of the present example are the same as the incident angle of light on the variable light attenuator 4, the half value width $\Delta\lambda_a$ of the spectral responsivity spectrum of the photodetection element 9, and the line width $\Delta\lambda_b$ of light (light to be measured) emitted from the object to be measured 2 of Example 3, respectively (see Table 4). Thus, in the present example, as in Example 3, the reductions in the variation component of the interference intensity caused by the first interference, the second interference, and the third interference among the plurality of multiple reflected light beams by (c) the line width $\Delta\lambda_b$ of the light (light to be measured) emitted from the object to be measured 2 will be considered.

<Reduction in Variation Component of Interference Intensity Caused by First Interference by Line Width $\Delta\lambda_b$ of Light (Light to be Measured) Emitted from Object to be Measured 2>

In the present example, when the relative inclination angle θ between the first light attenuation filter (light attenuation filter 10) and the second light attenuation filter (light attenuation filter 20) is 0.0° (see FIG. 5), the $\text{OPD}_{13} \times (1/\lambda - 1/(\lambda+\Delta\lambda_a))$, which is the left side of the conditional expression (3), is 1.000. When the relative inclination angle θ between the first light attenuation filter and the second light attenuation filter is 0.1° (see FIG. 6), $\text{OPD}_{13} \times (1/\lambda - 1/(\lambda+\Delta\lambda_a))$, which is the left side of the conditional expression (3), is 1.000. Therefore, the present example satisfies the conditional expression (3). The measurement value variation of the photometric device 1 due to the first interference (interference between light reflected twice by the first light attenuation filter and light reflected twice by the second light attenuation filter) when the relative inclination angle θ between the first light attenuation filter and the second light attenuation filter changes from 0.0° to 0.1° is 0.01%.

<Reduction in Variation Component of Interference Intensity Caused by Second Interference by Line Width $\Delta\lambda_b$ of Light (Light to be Measured) Emitted from Object to be Measured 2>

In the present example, when the relative inclination angle θ between the first light attenuation filter (light attenuation filter 10) and the second light attenuation filter (light attenuation filter 20) is 0.0° (see FIG. 7), the $\text{OPD}_{21} \times (1/\lambda - 1/(\lambda+\Delta\lambda_a))$, which is the left side of the conditional expression (8), is 2.999. When the relative inclination angle θ between the first light attenuation filter and the second light attenuation filter is 0.1° (see FIG. 9), $\text{OPD}_{21} \times (1/\lambda - 1/(\lambda+\Delta\lambda_a))$, which is the left side of the conditional expression (8), is 3.000. Therefore, the present example satisfies the conditional expression (8). The measurement value variation of the photometric device 1 due to the second interference (interference between light reflected four times by the first light attenuation filter and light reflected twice by the second light attenuation filter) when the relative inclination angle θ between the first light attenuation filter and the second light attenuation filter changes from 0.0° to 0.1° is 0.00%.

When the relative inclination angle θ between the first light attenuation filter (light attenuation filter 10) and the second light attenuation filter (light attenuation filter 20) is 0.0° (see FIG. 8), the $\text{OPD}_{22} \times (1/\lambda - 1/(\lambda+\Delta\lambda_a))$, which is the left side of the conditional expression (9), is 5.999. When the relative inclination angle θ between the first light attenuation filter and the second light attenuation filter is 0.1° (see FIG. 10), $\text{OPD}_{22} \times (1/\lambda - 1/(\lambda+\Delta\lambda_a))$, which is the left side of the conditional expression (9), is 5.999. Therefore, the present example satisfies the conditional expression (9). The measurement value variation of the photometric device 1 due to the second interference (interference between light reflected twice by the first light attenuation filter and light reflected four times by the second light attenuation filter) when the relative inclination angle θ between the first light attenuation filter and the second light attenuation filter changes from 0.0° to 0.1° is 0.00%.

<Reduction in Variation Component of Interference Intensity Caused by Third Interference by Line Width $\Delta\lambda_b$ of Light (Light to be Measured) Emitted from Object to be Measured 2>

In the present example, when the relative inclination angle θ between the third light attenuation filter (light attenuation filter 10) and the fourth light attenuation filter (light attenuation filter 20) is 0.0° (see FIG. 11), $\text{OPD}_{g1} \times (1/\lambda - 1/(\lambda+\Delta\lambda_b))$, which is the left side of the conditional expression (14), is 0.089. When the relative inclination angle θ between the third light attenuation filter and the fourth light attenuation filter is 0.1° (see FIG. 13), $\text{OPD}_{g1} \times (1/\lambda - 1/(\lambda+\Delta\lambda_b))$, which is the left side of the conditional expression (14), is 0.088. Therefore, the present example does not satisfy the conditional expression (14). The measurement value variation of the photometric device 1 due to the third interference (interference between light reflected twice by the third light attenuation filter and light reflected twice by the layer (for example, an air layer) between the third light attenuation filter and the fourth light attenuation filter) when the relative inclination angle θ between the third light attenuation filter and the fourth light attenuation filter changes from 0.0° to 0.1° is 3.43%

When the relative inclination angle θ between the third light attenuation filter (light attenuation filter 10) and the fourth light attenuation filter (light attenuation filter 20) is 0.0° (see FIG. 12), $\text{OPD}_{g1} \times (1/\lambda - 1/(\lambda+\Delta\lambda_b))$, which is the left side of the conditional expression (15), is 0.911. When the relative inclination angle θ between the third light attenuation filter and the fourth light attenuation filter is 0.1° (see FIG. 14), $\text{OPD}_{g1} \times (1/\lambda - 1/(\lambda+\Delta\lambda_b))$, which is the left side of the conditional expression (15), is 0.911. Therefore, the present example satisfies the conditional expression (15). The measurement value variation of the photometric device 1 due to the third interference (interference between light reflected twice by the fourth light attenuation filter and light reflected twice by the layer (for example, an air layer) between the third light attenuation filter and the fourth light attenuation filter) when the relative inclination angle θ between the third light attenuation filter and the fourth light attenuation filter changes from 0.0° to 0.1° is 0.06%.

The measurement value variation of the photometric device 1 of the present example is given by the sum of the measurement value variation caused by the first interference, the measurement value variation caused by the second interference, and the measurement value variation caused by the third interference. The measurement value variation of the photometric device 1 of the present example is 3.50%. Since the absolute value of the measurement value variation of the photometric device 1 of the present example is within 5%, the light to be measured can be accurately measured. The absolute value of the measurement value variation of the photometric device 1 of the present example is larger than the absolute value of the measurement value variation of the photometric device 1 of Example 3. Thus, the photometric device 1 of Example 3 is more desirable than the photometric device 1 of the present example.

Example 10, Example 11, and Example 12

Examples 10 to 12 will be described with reference to FIGS. 1 to 23. The photometric devices 1 of Examples 10 to 12 have configurations similar to those of the photometric devices 1 of Examples 1 to 3, but are mainly different in the following points.

The configurations of the variable light attenuators 4 of Examples 10 to 12 are as illustrated in Table 7. Thus, the optical path length of the transparent substrate 11 is different from the optical path length of the transparent substrate 21.

TABLE 7

|  | Example 10 | Example 11 | Example 12 |
|---|---|---|---|
| Thickness $d_1$ of transparent substrate 11 | 0.50 mm | 0.50 mm | 0.50 mm |
| Refractive index $n_1$ of transparent substrate 11 | 1.525 | 1.525 | 1.525 |
| Thickness $d_2$ of transparent substrate 21 | 1.00 mm | 1.00 mm | 1.00 mm |
| Refractive index $n_2$ of transparent substrate 21 | 1.525 | 1.525 | 1.525 |
| Gap G between light attenuation filter 10 and light attenuation filter 20 | 3.00 mm | 3.00 mm | 3.00 mm |

Example 10

The distribution of the incident angles of the light incident on the variable light attenuator 4 of the present example, the half value width $\Delta\lambda_a$ of the spectral responsivity spectrum of the photodetection element 9, and the line width $\Delta\lambda_b$ of the light (light to be measured) radiated from the object to be measured 2 are the same as the distribution of the incident angles of the light incident on the variable light attenuator 4 of Example 1, the half value width $\Delta\lambda_a$ of the spectral responsivity spectrum of the photodetection element 9, and the line width $\Delta\lambda_b$ of the light (light to be measured) radiated from the object to be measured 2, respectively (see Table 2). Thus, in the present example, as in Example 1, the reductions in the variation component of the interference intensity caused by the first interference, the second interference, and the third interference among the plurality of multiple reflected light beams by (a) the distribution of the incident angles of the light to be measured incident on the variable light attenuator 4 will be considered.

<Reduction in Variation Component of Interference Intensity Caused by First Interference Due to Distribution of Incident Angles of Light to be Measured Incident on Variable Light Attenuator 4>

In the present example, when the relative inclination angle θ between the first light attenuation filter (light attenuation filter 10) and the second light attenuation filter (light attenuation filter 20) is 0.0° (see FIG. 5), $|OPD_{\theta max1} - OPD_{\theta min1}|/\lambda$, which is the left side of the conditional expression (I), is 5.101. When the relative inclination angle θ between the first light attenuation filter and the second light attenuation filter is 0.1° (see FIG. 6), $|OPD_{\theta max1} - OPD_{\theta min1}|/\lambda$, which is the left side of the conditional expression (1), is 4.898. Therefore, the present example satisfies the conditional expression (1). The measurement value variation of the photometric device 1 due to the first interference (interference between light reflected twice by the first light attenuation filter and light reflected twice by the second light attenuation filter) when the relative inclination angle θ between the first light attenuation filter and the second light attenuation filter changes from 0.0° to 0.1° is −0.03%.

<Reduction in Variation Component of Interference Intensity Caused by Second Interference Due to Distribution of Incident Angles of Light to be Measured Incident on Variable Light Attenuator 4>

In the present example, when the relative inclination angle θ between the first light attenuation filter (light attenuation filter 10) and the second light attenuation filter (light attenuation filter 20) is 0.0° (see FIG. 7), $|OPD_{\theta max2} - OPD_{\theta min2}|/\lambda$, which is the left side of the conditional expression (4), is 0.000. When the relative inclination angle θ between the first light attenuation filter and the second light attenuation filter is 0.1° (see FIG. 9), $|OPD_{\theta max2} - OPD_{\theta min2}|/\lambda$, which is the left side of the conditional expression (4), is 0.203. Therefore, the present example does not satisfy the conditional expression (4). The measurement value variation of the photometric device 1 due to the second interference (interference between light reflected four times by the first light attenuation filter and light reflected twice by the second light attenuation filter) when the relative inclination angle θ between the first light attenuation filter and the second light attenuation filter changes from 0.0° to 0.1° is −0.20%.

When the relative inclination angle θ between the first light attenuation filter (light attenuation filter 10) and the second light attenuation filter (light attenuation filter 20) is 0.0° (see FIG. 8), $|OPD_{\theta max3} - OPD_{\theta min3}|/\lambda$, which is the left side of the conditional expression (5), is 15.303. When the relative inclination angle θ between the first light attenuation filter and the second light attenuation filter is 0.1° (see FIG. 10), $|OPD_{\theta max3} - OPD_{\theta min3}|/\lambda$, which is the left side of the conditional expression (5), is 14.897. Therefore, the present example satisfies the conditional expression (5). The measurement value variation of the photometric device 1 due to the second interference (interference between light reflected twice by the first light attenuation filter and light reflected four times by the second light attenuation filter) when the relative inclination angle θ between the first light attenuation filter and the second light attenuation filter changes from 0.0° to 0.1° is 0.00%.

<Reduction in Variation Component of Interference Intensity Caused by Third Interference Due to Distribution of Incident Angles of Light to be Measured Incident on Variable Light Attenuator 4>

In the present example, when the relative inclination angle θ between the third light attenuation filter (light attenuation filter 10) and the fourth light attenuation filter (light attenuation filter 20) is 0.0° (see FIG. 13), $|OPD_{\theta max4} - OPD_{\theta min4}|/\lambda$, which is the left side of the conditional expression (10), is 41.694. When the relative inclination angle θ between the third light attenuation filter and the fourth light attenuation filter is 0.1° (see FIG. 16). $|OPD_{\theta max4} - OPD_{\theta min4}|/\lambda$, which is the left side of the conditional expression (10), is 42.274. Therefore, the present example satisfies the conditional expression (10). The measurement value variation of the photometric device 1 due to the third interference (interference between light reflected twice by the third light attenuation filter and light reflected twice by the layer (for example, an air layer) between the third light attenuation filter and the fourth light attenuation filter) when the relative inclination angle θ between the third light attenuation filter and the fourth light attenuation filter changes from 0.0° to 0.1° is 0.03%.

Figure 12:
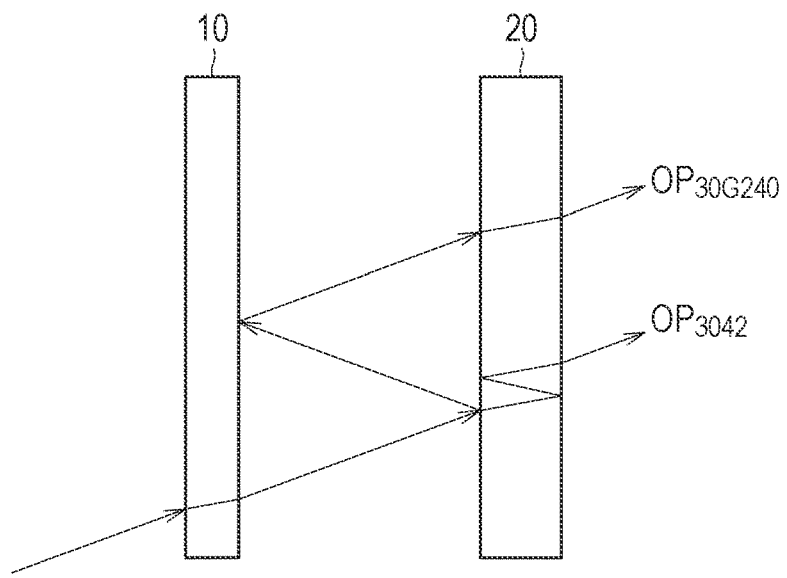
FIG. 12 is a schematic diagram illustrating third interference in the variable light attenuator of the embodiment.

When the relative inclination angle θ between the third light attenuation filter (light attenuation filter 10) and the fourth light attenuation filter (light attenuation filter 20) is 0.0° (see FIG. 12). $|OPD_{\theta max5} - OPD_{\theta min5}|$, which is the left side of the conditional expression (11), is 36.594. When the relative inclination angle θ between the third light attenuation filter and the fourth light attenuation filter is 0.1° (see FIG. 10), |OPD$_{θmax5}$−OPD$_{θmin5}$|, which is the left side of the conditional expression (11), is 37.274. Therefore, the present example satisfies the conditional expression (11). The measurement value variation of the photometric device 1 due to the third interference (interference between light reflected twice by the fourth light attenuation filter and light reflected twice by the layer (for example, an air layer) between the third light attenuation filter and the fourth light attenuation filter) when the relative inclination angle θ between the third light attenuation filter and the fourth light attenuation filter changes from 0.0° to 0.1° is 0.00%.

The measurement value variation of the photometric device 1 of the present example is given by the sum of the measurement value variation caused by the first interference, the measurement value variation caused by the second interference, and the measurement value variation caused by the third interference. The measurement value variation of the photometric device 1 of the present example is −0.21%. Since the absolute value of the measurement value variation of the photometric device 1 of the present example is within 5%, the light to be measured can be accurately measured.

Example 11

The incident angle of light on the variable light attenuator 4, the half value width Δλ$_a$ of the spectral responsivity spectrum of the photodetection element 9, and the line width Δλ$_b$ of light (light to be measured) emitted from the object to be measured 2 of the present example are the same as the incident angle of light on the variable light attenuator 4, the half value width Δλ$_a$ of the spectral responsivity spectrum of the photodetection element 9, and the line width Δλ$_b$ of light (light to be measured) emitted from the object to be measured 2 of Example 2, respectively (see Table 3). Thus, in the present example, as in Example 2, the reductions in the variation component of the interference intensity caused by the first interference, the second interference, and the third interference among the plurality of multiple reflected light beams by (b) the half value width Δλ$_a$ of the spectral responsivity spectrum of the photodetection element 9 will be considered.

<Reduction in Variation Component of Interference Intensity Caused by First Interference by Half Value Width Δλ$_a$ of Spectral Responsivity Spectrum of Photodetection Element 9>

In the present example, when the relative inclination angle θ between the first light attenuation filter (light attenuation filter 10) and the second light attenuation filter (light attenuation filter 20) is 0.0° (see FIG. 5), the OPD$_{12}$ (1/λ−1/(λ+Δλ$_b$)), which is the left side of the conditional expression (2), is 7.479. When the relative inclination angle θ between the first light attenuation filter and the second light attenuation filter is 0.1° (see FIG. 6), OPD$_{12}$×(1/λ−1/(λ+Δλ$_b$)), which is the left side of the conditional expression (2), is 7.480. Therefore, the present example satisfies the conditional expression (2). The measurement value variation of the photometric device 1 due to the first interference (interference between light reflected twice by the first light attenuation filter and light reflected twice by the second light attenuation filter) when the relative inclination angle θ between the first light attenuation filter and the second light attenuation filter changes from 0.0° to 0.1° is 0.00%.

<Reduction in Variation Component of Interference Intensity Caused by Second Interference by Half Value Width Δλ$_a$ of Spectral Responsivity Spectrum of Photodetection Element 9>

In the present example, when the relative inclination angle θ between the first light attenuation filter (light attenuation filter 10) and the second light attenuation filter (light attenuation filter 20) is 0.0° (see FIG. 7), the OPD$_{21}$×(1/λ−1/(λ+Δλ$_a$)), which is the left side of the conditional expression (6), is 0.000. When the relative inclination angle θ between the first light attenuation filter and the second light attenuation filter is 0.1° (see FIG. 9), OPD$_{21}$×(1/λ−1/(λ+Δλ$_a$)), which is the left side of the conditional expression (6), is 0.001. Therefore, the present example does not satisfy the conditional expression (6). The measurement value variation of the photometric device 1 due to the second interference (interference between light reflected four times by the first light attenuation filter and light reflected twice by the second light attenuation filter) when the relative inclination angle θ between the first light attenuation filter and the second light attenuation filter changes from 0.0° to 0.1° is −0.20%.

When the relative inclination angle θ between the first light attenuation filter (light attenuation filter 10) and the second light attenuation filter (light attenuation filter 20) is 0.0° (see FIG. 8), the OPD$_{21}$×(1/λ−1/(λ+Δλ$_b$)), which is the left side of the conditional expression (7), is 22.438 When the relative inclination angle θ between the first light attenuation filter and the second light attenuation filter is 0.1° (see FIG. 10), OPD$_{21}$×(1/λ−1/(λ+Δλ$_a$)), which is the left side of the conditional expression (7), is 22.440. Therefore, the present example satisfies the conditional expression (7). The measurement value variation of the photometric device 1 due to the second interference (interference between light reflected twice by the first light attenuation filter and light reflected four times by the second light attenuation filter) when the relative inclination angle θ between the first light attenuation filter and the second light attenuation filter changes from 0.0° to 0.1° is 0.00%.

<Reduction in Variation Component of Interference Intensity Caused by Third Interference by Half Value Width Δλ$_a$ of Spectral Responsivity Spectrum of Photodetection Element 9>

Figure 13:
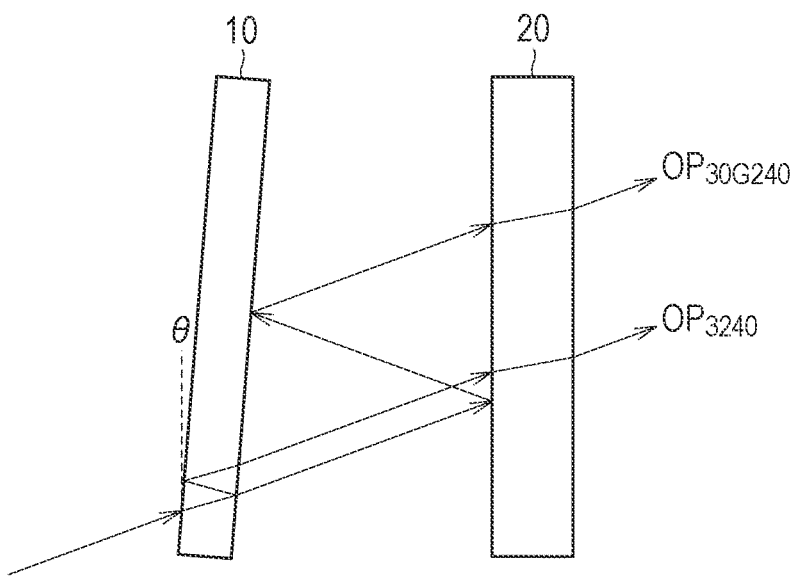
FIG. 13 is a schematic diagram illustrating third interference in the variable light attenuator of the embodiment.
Figure 14:
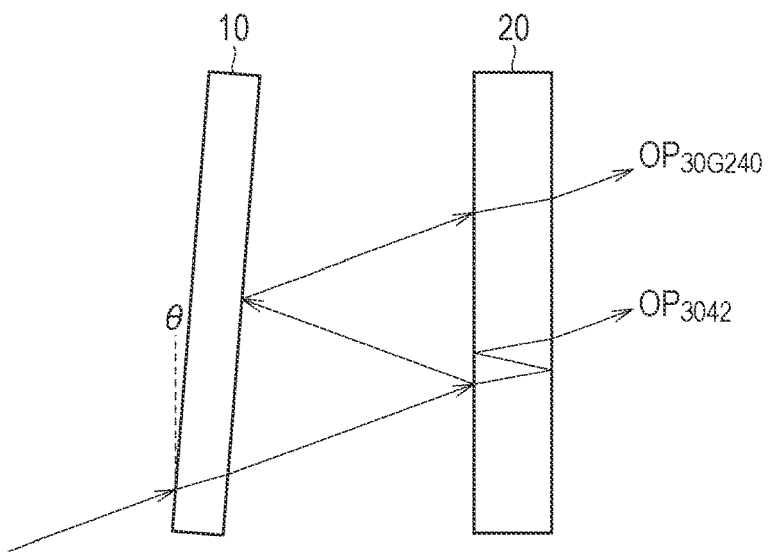
FIG. 14 is a schematic diagram illustrating third interference in the variable light attenuator of the embodiment.
Figure 15:
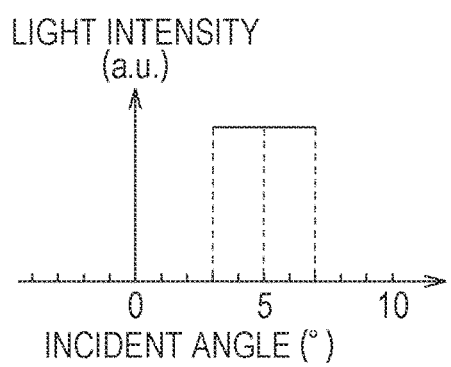
FIG. 15 is a graph illustrating a distribution of incident angles of light incident on the variable light attenuator in Example 1.

In the present example, when the relative inclination angle θ between the third light attenuation filter (light attenuation filter 10) and the fourth light attenuation filter (light attenuation filter 20) is 0.0° (see FIG. 11), OPD$_{g1}$×(1/λ−1/(λ+Δλ$_a$)), which is the left side of the conditional expression (12), is 21.881 When the relative inclination angle θ between the third light attenuation filter and the fourth light attenuation filter is 0.1° (see FIG. 13). OPD$_{g1}$×(1/λ−1/(λ+Δλ$_a$)), which is the left side of the conditional expression (12), is 21.878 Therefore, the present example satisfies the conditional expression (12). The measurement value variation of the photometric device 1 due to the third interference (interference between light reflected twice by the third light attenuation filter and light reflected twice by the layer (for example, an air layer) between the third light attenuation filter and the fourth light attenuation filter) when the relative inclination angle θ between the third light attenuation filter and the fourth light attenuation filter changes from 0.0° to 0.1° is 0.00%.

When the relative inclination angle θ between the third light attenuation filter (light attenuation filter 10) and the fourth light attenuation filter (light attenuation filter 20) is 0.0° (see FIG. 12), OPD$_{g2}$×(1/λ−1/(λ+Δλ$_a$)), which is the left side of the conditional expression (13), is 14.402. When the relative inclination angle θ between the third light attenuation filter and the fourth light attenuation filter is 0.1° (see FIG. 14), $OPD_{g2} \times (1/\lambda - 1/(\lambda + \Delta\lambda_a))$, which is the left side of the conditional expression (13), is 14.398. Therefore, the present example satisfies the conditional expression (13). The measurement value variation of the photometric device 1 due to the third interference (interference between light reflected twice by the fourth light attenuation filter and light reflected twice by the layer (for example, an air layer) between the third light attenuation filter and the fourth light attenuation filter) when the relative inclination angle θ between the third light attenuation filter and the fourth light attenuation filter changes from 0.0° to 0.1° is 0.00%.

The measurement value variation of the photometric device 1 of the present example is given by the sum of the measurement value variation caused by the first interference, the measurement value variation caused by the second interference, and the measurement value variation caused by the third interference. The measurement value variation of the photometric device 1 of the present example is −0.20%. Since the absolute value of the measurement value variation of the photometric device 1 of the present example is within 5%, the light to be measured can be accurately measured. The absolute value of the measurement value variation of the photometric device 1 of the present example is larger than the absolute value of the measurement value variation of the photometric device 1 of Example 2. Thus, the photometric device 1 of Example 2 is more desirable than the photometric device 1 of the present example.

Example 12

The incident angle of light on the variable light attenuator 4, the half value width $\Delta\lambda_a$ of the spectral responsivity spectrum of the photodetection element 9, and the line width $\Delta\lambda_b$ of light (light to be measured) emitted from the object to be measured 2 of the present example are the same as the incident angle of light on the variable light attenuator 4, the half value width $\Delta\lambda_a$ of the spectral responsivity spectrum of the photodetection element 9, and the line width $\Delta\lambda_b$ of light (light to be measured) emitted from the object to be measured 2 of Example 3, respectively (see Table 4). Thus, in the present example, as in Example 3, the reductions in the variation component of the interference intensity caused by the first interference, the second interference, and the third interference among the plurality of multiple reflected light beams by (c) the line width $\Delta\lambda_b$ of the light (light to be measured) emitted from the object to be measured 2 will be considered.

<Reduction in Variation Component of Interference Intensity Caused by First Interference by Line Width $\Delta\lambda_b$ of Light (Light to be Measured) Emitted from Object to be Measured 2>

In the present example, when the relative inclination angle θ between the first light attenuation filter (light attenuation filter 10) and the second light attenuation filter (light attenuation filter 20) is 0.0° (see FIG. 5), the $OPD_{13} \times (1/\lambda - 1/(\lambda + \Delta\lambda_b))$, which is the left side of the conditional expression (3), is 2.500 When the relative inclination angle θ between the first light attenuation filter and the second light attenuation filter is 0.1° (see FIG. 6), $OPD_{13} \times (1/\lambda - 1/(\lambda + \Delta\lambda_b))$, which is the left side of the conditional expression (3), is 2.500. Therefore, the present example satisfies the conditional expression (3). The measurement value variation of the photometric device 1 due to the first interference (interference between light reflected twice by the first light attenuation filter and light reflected twice by the second light attenuation filter) when the relative inclination angle θ between the first light attenuation filter and the second light attenuation filter changes from 0.0° to 0.1° is 0.00%.

<Reduction in Variation Component of Interference Intensity Caused by Second Interference by Line Width $\Delta\lambda_b$ of Light (Light to be Measured) Emitted from Object to be Measured 2>

In the present example, when the relative inclination angle θ between the first light attenuation filter (light attenuation filter 10) and the second light attenuation filter (light attenuation filter 20) is 0.0° (see FIG. 7), the $OPD_{21} \times (1/\lambda - 1/(\lambda + \Delta\lambda_b))$, which is the left side of the conditional expression (8), is 0.000. When the relative inclination angle θ between the first light attenuation filter and the second light attenuation filter is 0.1° (see FIG. 9), $OPD_{21} \times (1/\lambda - 1/(\lambda + \Delta\lambda_b))$, which is the left side of the conditional expression (8), is 0.000. Therefore, the present example does not satisfy the conditional expression (8). The measurement value variation of the photometric device 1 due to the second interference (interference between light reflected four times by the first light attenuation filter and light reflected twice by the second light attenuation filter) when the relative inclination angle θ between the first light attenuation filter and the second light attenuation filter changes from 0.0° to 0.1° is −0.20%.

When the relative inclination angle θ between the first light attenuation filter (light attenuation filter 10) and the second light attenuation filter (light attenuation filter 20) is 0.0° (see FIG. 8), the $OPD_{22} \times (1/\lambda - 1/(\lambda + \Delta\lambda_b))$, which is the left side of the conditional expression (9), is 7.499. When the relative inclination angle θ between the first light attenuation filter and the second light attenuation filter is 0.1° (see FIG. 10), $OPD_2 \times (1/\lambda - 1/(\lambda + \Delta\lambda_b))$, which is the left side of the conditional expression (9), is 7.499. Therefore, the present example satisfies the conditional expression (9). The measurement value variation of the photometric device 1 due to the second interference (interference between light reflected twice by the first light attenuation filter and light reflected four times by the second light attenuation filter) when the relative inclination angle θ between the first light attenuation filter and the second light attenuation filter changes from 0.0° to 0.1° is 0.00%.

<Reduction in Variation Component of Interference Intensity Caused by Third Interference by Line Width $\Delta\lambda_b$ of Light (Light to be Measured) Emitted from Object to be Measured 2>

In the present example, when the relative inclination angle θ between the third light attenuation filter (light attenuation filter 10) and the fourth light attenuation filter (light attenuation filter 20) is 0.0° (see FIG. 11). $OPD_{g1} \times (1/\lambda - 1/(\lambda + \Delta\lambda_b))$, which is the left side of the conditional expression (14), is 7.312. When the relative inclination angle θ between the third light attenuation filter and the fourth light attenuation filter is 0.1° (see FIG. 13), $OPD_{g1} \times (1/\lambda - 1/(\lambda + \Delta\lambda_b))$, which is the left side of the conditional expression (14), is 7.311. Therefore, the present example satisfies the conditional expression (14). The measurement value variation of the photometric device 1 due to the third interference (interference between light reflected twice by the third light attenuation filter and light reflected twice by the layer (for example, an air layer) between the third light attenuation filter and the fourth light attenuation filter) when the relative inclination angle θ between the third light attenuation filter and the fourth light attenuation filter changes from 0.0° to 0.1° is 0.00%.

When the relative inclination angle θ between the third light attenuation filter (light attenuation filter 10) and the fourth light attenuation filter (light attenuation filter 20) is 0.0° (see FIG. 12), $OPD_{g1} \times (1/\lambda - 1/(\lambda + \Delta\lambda_b))$, which is the left side of the conditional expression (15), is 4.813. When the relative inclination angle θ between the third light attenuation filter and the fourth light attenuation filter is 0.1° (see FIG. 14), $OPD_{g1} \times (1/\lambda - 1/(\lambda + \Delta\lambda_b))$, which is the left side of the conditional expression (15), is 4.812. Therefore, the present example satisfies the conditional expression (15). The measurement value variation of the photometric device 1 due to the third interference (interference between light reflected twice by the fourth light attenuation filter and light reflected twice by the layer (for example, an air layer) between the third light attenuation filter and the fourth light attenuation filter) when the relative inclination angle θ between the third light attenuation filter and the fourth light attenuation filter changes from 0.0° to 0.1° is 0.00%.

The measurement value variation of the photometric device 1 of the present example is given by the sum of the measurement value variation caused by the first interference, the measurement value variation caused by the second interference, and the measurement value variation caused by the third interference. The measurement value variation of the photometric device 1 of the present example is −0.20%. Since the absolute value of the measurement value variation of the photometric device 1 of the present example is within 5%, the light to be measured can be accurately measured. The absolute value of the measurement value variation of the photometric device 1 of the present example is larger than the absolute value of the measurement value variation of the photometric device 1 of Example 3. Thus, the photometric device 1 of Example 3 is more desirable than the photometric device 1 of the present example.

Modification Example

The optical path length of the transparent substrate 11 may be made different from the optical path length of the transparent substrate 21 by making the refractive index $n_1$ of the transparent substrate 11 different from the refractive index $n_2$ of the transparent substrate 21.

The photometric device 1 of the embodiment includes two light attenuation filters, but may include three or more light attenuation filters. It is sufficient if any two light attenuation filters among the plurality of light attenuation filters included in the photometric device 1 satisfy the conditional expression described in the embodiment.

The photometric device 1 of the embodiment can also be applied to a photometric device such as a stimulus value direct reading colorimeter. In that case, the width of the spectral responsivity spectrum of the photodetection element 9 is as large as about 50 nm or more, but if the conditions described in the embodiment are satisfied, it is possible to provide the photometric device 1 that has a compact size and can measure light with higher accuracy while achieving a wide dynamic range.

In the embodiment, it is assumed that two light attenuation filters are inserted or retracted, but a plurality of filters may be fixed on the optical axis 2p. Even in a case where a plurality of filters is fixed on the optical axis 2p, the relative inclination angle between the plurality of filters may slightly change due to a change in environmental temperature around the photometric device 1, a vibration impact applied to the photometric device 1, or the like. As described above, even when a plurality of filters is fixed on the optical axis 2p and the relative inclination angle between the plurality of filters slightly changes, it is possible to measure light more stably with higher accuracy.

The photometric device 1 of the embodiment is not limited to the light attenuation filter, and may include an interference filter having characteristics different from those of the light attenuation filter, such as a shortcut filter, a long-cut filter, or a band-pass filter. The photometric device 1 including the interference filter having characteristics different from those of the light attenuation filter can perform optical measurement with different characteristics The embodiments disclosed this time are to be considered exemplary in all respects and not restrictive. The scope of the present disclosure is illustrated by the claims, and it is intended that all modifications are included in the meaning and scope equivalent to the claims.

REFERENCE SIGNS LIST

1 Photometric device
2 Object to be measured
2p Optical axis
3 Collimator lens
4 Variable light attenuator
5 Driving device
6 Spectroscopic element
7 Condenser lens
8 Photodetector
9 Photodetection element
10, 20 Light attenuation filter
11, 21 Transparent substrate
12, 13, 22, 23 Interference multilayer film
14, 24 Incident surface
15, 25 Emission surface.

The invention claimed is:

1. A photometric device, comprising:

a variable light attenuator including a plurality of light attenuation filters and a driving device; and a photodetector that receives light that has passed through the variable light attenuator, wherein the driving device is capable of inserting the plurality of light attenuation filters into an optical axis of the light and retracting the plurality of light attenuation filters from the optical axis independently of each other, and the plurality of light attenuation filters is arranged at different positions in a direction along the optical axis, each of the plurality of light attenuation filters includes an interference multilayer film and a transparent substrate that supports the interference multilayer film, and when a combination of any two of the plurality of light attenuation filters is set as a first light attenuation filter and a second light attenuation filter, the second light attenuation filter is closer to the photodetector than the first light attenuation filter in the direction along the optical axis, the first light attenuation filter includes a first interference multilayer film as the interference multilayer film and a first transparent substrate as the transparent substrate, the second light attenuation filter includes a second interference multilayer film as the interference multilayer film and a second transparent substrate as the transparent substrate, and a first optical path length of the first transparent substrate is different from a second optical path length of the second transparent substrate.

2. The photometric device according to claim 1, wherein the light has a distribution of incident angles to the variable light attenuator, and
a following conditional expression (1) is satisfied:

$$|OPD_{\theta max1} - OPD_{\theta min1}|/\lambda > 0.5 \quad (1)$$

$OPD_{\theta max1} = (OP_{1220max} - OP_{1022max})$,
$OPD_{\theta min1} = (OP_{1220min} - OP_{1022min})$,
$\lambda$ is a wavelength of the light included in a measurable wavelength range of the photometric device,
$OP_{1220max}$ is an optical path length of maximum incident angle light that is reflected twice by the first light attenuation filter and passes through the second light attenuation filter without being reflected by the second light attenuation filter, and the maximum incident angle light is light having a maximum incident angle to the variable light attenuator among the light,
$OP_{1022max}$ is an optical path length of the maximum incident angle light that passes through the first light attenuation filter without being reflected by the first light attenuation filter and is reflected twice by the second light attenuation filter,
$OP_{1220min}$ is an optical path length of minimum incident angle light that is reflected twice by the first light attenuation filter and passes through the second light attenuation filter without being reflected by the second light attenuation filter, and the minimum incident angle light is light having a minimum incident angle to the variable light attenuator among the light, and
$OP_{1022min}$ is an optical path length of the minimum incident angle light that passes through the first light attenuation filter without being reflected by the first light attenuation filter and is reflected twice by the second light attenuation filter.

3. The photometric device according to claim 1, wherein the photometric device is a spectrometer capable of measuring spectral information.

4. The photometric device according to claim 3, wherein a following conditional expression (2) is satisfied:

$$OPD_{12} \times (1/\lambda - 1/(\lambda + \Delta\lambda_a)) > 0.5 \quad (2)$$

where
$OPD_{12} = |OP_{1220} - OP_{1022}|$,
$\lambda$ is a wavelength of the light included in a measurable wavelength range of the photometric device,
the $\Delta\lambda_a$ is a half value width of a spectral responsivity spectrum of a photodetection element included in the photodetector,
$OP_{1220}$ is an optical path length of the light that is reflected twice by the first light attenuation filter and passes through the second light attenuation filter without being reflected by the second light attenuation filter, and
$OP_{1022}$ is an optical path length of the light that passes through the first light attenuation filter without being reflected by the first light attenuation filter and is reflected twice by the second light attenuation filter.

5. The photometric device according to claim 1, wherein a following conditional expression (3) is satisfied:

$$OPD_{13} \times (1/\lambda - 1/(\lambda + \Delta\lambda_b)) > 0.5 \quad (3)$$

where
$OPD_{13} = |OP_{1220} - OP_{1022}|$,
$\lambda$ is a wavelength of the light included in a measurable wavelength range of the photometric device,
the $\alpha\lambda_b$ is a line width of the light emitted from an object to be measured,
$OP_{1220}$ is an optical path length of the light that is reflected twice by the first light attenuation filter and passes through the second light attenuation filter without being reflected by the second light attenuation filter, and
$OP_{1022}$ is an optical path length of the light that passes through the first light attenuation filter without being reflected by the first light attenuation filter and is reflected twice by the second light attenuation filter.

6. The photometric device according to claim 1, wherein a first thickness of the first transparent substrate is different from a second thickness of the second transparent substrate.

7. The photometric device according to claim 1, wherein a first refractive index of the first transparent substrate is different from a second refractive index of the second transparent substrate.

8. The photometric device according to claim 1, wherein the interference multilayer film of each of the plurality of light attenuation filters is formed of a same material, and
the transparent substrate of each of the plurality of light attenuation filters is formed of a same material.

9. The photometric device according to claim 1, wherein each of the plurality of light attenuation filters is arranged at a same angle with respect to the optical axis.

10. The photometric device according to claim 1, further comprising a collimating lens arranged on an incident side of the plurality of light attenuation filters.

11. The photometric device according to claim 2, wherein following conditional expressions (4) and (5) are satisfied:

$$|OPD_{\theta max2} - OPD_{\theta min2}|/\lambda > 0.5 \quad (4)$$

$$|OPD_{\theta max3} - OPD_{\theta min3}|/\lambda > 0.5 \quad (5)$$

where
$OPD_{\theta max2} = (OP_{1420max} - OP_{1022max})$,
$OPD_{\theta min2} = (OP_{1420min} - OP_{1022min})$,
$OPD_{\theta max3} = (OP_{1024max} - OP_{1220max})$,
$OPD_{\theta min3} = (OP_{1024min} - OP_{1220min})$,
$OP_{1420max}$ is an optical path length of the maximum incident angle light that is reflected four times by the first light attenuation filter and passes through the second light attenuation filter without being reflected by the second light attenuation filter,
$OP_{1022max}$ is an optical path length of the maximum incident angle light that passes through the first light attenuation filter without being reflected by the first light attenuation filter and is reflected twice by the second light attenuation filter,
$OP_{1420min}$ is an optical path length of the minimum incident angle light that is reflected four times by the first light attenuation filter and passes through the second light attenuation filter without being reflected by the second light attenuation filter,
$OP_{1022min}$ is an optical path length of the minimum incident angle light that passes through the first light attenuation filter without being reflected by the first light attenuation filter and is reflected twice by the second light attenuation filter,
$OP_{1024max}$ is an optical path length of the maximum incident angle light that passes through the first light attenuation filter without being reflected by the first light attenuation filter and is reflected four times by the second light attenuation filter,
$OP_{1220max}$ is an optical path length of the maximum incident angle light that is reflected twice by the first light attenuation filter and passes through the second light attenuation filter without being reflected by the second light attenuation filter, $OP_{1024min}$ is an optical path length of the minimum incident angle light that passes through the first light attenuation filter without being reflected by the first light attenuation filter and is reflected four times by the second light attenuation filter, and $OP_{1220min}$ is an optical path length of the minimum incident angle light that is reflected twice by the first light attenuation filter and passes through the second light attenuation filter without being reflected by the second light attenuation filter.

12. The photometric device according to claim 4, wherein following conditional expressions (6) and (7) are satisfied:

$$OPD_{21} \times (1/\lambda - 1/(\lambda + \Delta\lambda_a)) > 0.5 \qquad (6)$$

$$OPD_{22} \times (1/\lambda - 1/(\lambda + \Delta\lambda_a)) > 0.5 \qquad (7)$$

where
$OPD_{21} = |OP_{1420} - OP_{1022}|$,
$OPD_{22} = |OP_{1024} - OP_{1220}|$, $OP_{1420}$ is an optical path length of the light that is reflected four times by the first light attenuation filter and passes through the second light attenuation filter without being reflected by the second light attenuation filter, $OP_{1022}$ is an optical path length of the light that passes through the first light attenuation filter without being reflected by the first light attenuation filter and is reflected twice by the second light attenuation filter, $OP_{1024}$ is an optical path length of the light that passes through the first light attenuation filter without being reflected by the first light attenuation filter and is reflected four times by the second light attenuation filter, and $OP_{1220}$ is an optical path length of the light that is reflected twice by the first light attenuation filter and passes through the second light attenuation filter without being reflected by the second light attenuation filter.

13. The photometric device according to claim 5, wherein following conditional expressions (8) and (9) are satisfied:

$$OPD_{21} \times (1/\lambda - 1/(\lambda + \Delta\lambda_b)) > 0.5 \qquad (8)$$

$$OPD_{22} \times (1/\lambda - 1/(\lambda + \Delta\lambda_b)) > 0.5 \qquad (9)$$

where
$OPD_{21} = |OP_{1420} - OP_{1022}|$,
$OPD_{22} = |OP_{1024} - OP_{1220}|$, $OP_{1420}$ is an optical path length of the light that is reflected four times by the first light attenuation filter and passes through the second light attenuation filter without being reflected by the second light attenuation filter, $OP_{1022}$ is an optical path length of the light that passes through the first light attenuation filter without being reflected by the first light attenuation filter and is reflected twice by the second light attenuation filter, $OP_{1024}$ is an optical path length of the light that passes through the first light attenuation filter without being reflected by the first light attenuation filter and is reflected four times by the second light attenuation filter, and $OP_{1220}$ is an optical path length of the light that is reflected twice by the first light attenuation filter and passes through the second light attenuation filter without being reflected by the second light attenuation filter.

14. The photometric device according to claim 2, wherein the plurality of light attenuation filters includes a third light attenuation filter as the first light attenuation filter and a fourth light attenuation filter as the second light attenuation filter, and the third light attenuation filter and the fourth light attenuation filter are any two light attenuation filters adjacent to each other among the plurality of light attenuation filters, and following conditional expressions (10) and (11) are satisfied:

$$|OPD_{\theta max4} - OPD_{\theta min4}|/\lambda > 0.5 \qquad (10)$$

$$|OPD_{\theta max5} - OPD_{\theta min4}|/\lambda > 0.5 \qquad (11)$$

where
$OPD_{\theta max4} = (OP_{3240max} - OP_{30G240max})$,
$OPD_{\theta min4} = (OP_{3240min} - OP_{30G240min})$,
$OPD_{\theta max5} = (OP_{3042max} - OP_{30G240max})$,
$OPD_{\theta min5} = (OP_{3042min} - OP_{30G240min})$, $OP_{3240max}$ is an optical path length of the maximum incident angle light that is reflected twice by the third light attenuation filter and passes through the fourth light attenuation filter without being reflected by the fourth light attenuation filter, $OP_{30G240max}$ is an optical path length of the maximum incident angle light that passes through the third light attenuation filter and the fourth light attenuation filter without being reflected by the third light attenuation filter and the fourth light attenuation filter and is reflected twice by a layer between the third light attenuation filter and the fourth light attenuation filter, $OP_{3240min}$ is an optical path length of the minimum incident angle light that is reflected twice by the third light attenuation filter and passes through the fourth light attenuation filter without being reflected by the fourth light attenuation filter, $OP_{30G240min}$ is an optical path length of the minimum incident angle light that passes through the third light attenuation filter and the fourth light attenuation filter without being reflected by the third light attenuation filter and the fourth light attenuation filter and is reflected twice by the layer between the third light attenuation filter and the fourth light attenuation filter, $OP_{3042max}$ is an optical path length of the maximum incident angle light that passes through the third light attenuation filter without being reflected by the third light attenuation filter and is reflected twice by the fourth light attenuation filter, and $OP_{3042min}$ is an optical path length of the minimum incident angle light that passes through the third light attenuation filter without being reflected by the third light attenuation filter and is reflected twice by the fourth light attenuation filter.

15. The photometric device according to claim 4, wherein the plurality of light attenuation filters includes a third light attenuation filter as the first light attenuation filter and a fourth light attenuation filter as the second light attenuation filter, and the third light attenuation filter and the fourth light attenuation filter are any two light attenuation filters adjacent to each other among the plurality of light attenuation filters, and following conditional expressions (12) and (13) are satisfied:

$$OPD_{g1} \times (1/\lambda - 1/(\lambda + \Delta\lambda_a)) > 0.5 \qquad (12)$$

$$OPD_{g2} \times (1/\lambda - 1/(\lambda + \Delta\lambda_a)) > 0.5 \qquad (13)$$

where $OPD_{g1} = |OP_{3240} - OP_{30G240}|$, $OPD_{g2} = |OP_{3042} - OP_{30G240}|$, $OP_{3240}$ is an optical path length of the light that is reflected twice by the third light attenuation filter and passes through the fourth light attenuation filter without being reflected by the fourth light attenuation filter, $OP_{30G240}$ is an optical path length of the light that passes through the third light attenuation filter and the fourth light attenuation filter without being reflected by the third light attenuation filter and the fourth light attenuation filter and is reflected twice by a layer between the third light attenuation filter and the fourth light attenuation filter, and $OP_{3042}$ is an optical path length of the light that passes through the third light attenuation filter without being reflected by the third light attenuation filter and is reflected twice by the fourth light attenuation filter.

16. The photometric device according to claim 5, wherein the plurality of light attenuation filters includes a third light attenuation filter as the first light attenuation filter and a fourth light attenuation filter as the second light attenuation filter, and the third light attenuation filter and the fourth light attenuation filter are any two light attenuation filters adjacent to each other among the plurality of light attenuation filters, and following conditional expressions (14) and (15) are satisfied:

$$OPD_{g1} \times (1/\lambda - 1/(\lambda + \Delta\lambda_b)) > 0.5 \quad (14)$$

$$OPD_{g2} \times (1/\lambda - 1/(\lambda + \Delta\lambda_b)) > 0.5 \quad (15)$$

where $OPD_{g1} = |OP_{3240} - OP_{30G240}|$, and $OPD_{g2} = |OP_{3042} - OP_{30G240}|$, $OP_{3240}$ is an optical path length of the light that is reflected twice by the third light attenuation filter and passes through the fourth light attenuation filter without being reflected by the fourth light attenuation filter, $OP_{30G240}$ is an optical path length of the light that passes through the third light attenuation filter and the fourth light attenuation filter without being reflected by the third light attenuation filter and the fourth light attenuation filter and is reflected twice by a layer between the third light attenuation filter and the fourth light attenuation filter, and $OP_{3042}$ is an optical path length of the light that passes through the third light attenuation filter without being reflected by the third light attenuation filter and is reflected twice by the fourth light attenuation filter.

17. The photometric device according to claim 2, wherein a first thickness of the first transparent substrate is different from a second thickness of the second transparent substrate.

18. The photometric device according to claim 2, wherein a first refractive index of the first transparent substrate is different from a second refractive index of the second transparent substrate.

19. The photometric device according to claim 2, wherein the interference multilayer film of each of the plurality of light attenuation filters is formed of a same material, and the transparent substrate of each of the plurality of light attenuation filters is formed of a same material.

20. The photometric device according to claim 2, wherein each of the plurality of light attenuation filters is arranged at a same angle with respect to the optical axis.

* * * * *